(12) United States Patent
Klein et al.

(10) Patent No.: US 8,531,655 B2
(45) Date of Patent: Sep. 10, 2013

(54) COMPENSATING FOR NON-IDEAL MULTI-CORE OPTICAL FIBER STRUCTURE

(75) Inventors: Justin W. Klein, Blacksburg, VA (US); Mark E. Froggatt, Blacksburg, VA (US); Stephen T. Kreger, Blacksburg, VA (US); Dawn K. Gifford, Blacksburg, VA (US); Sandra M. Klute, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 180 days.

(21) Appl. No.: 13/233,577

(22) Filed: Sep. 15, 2011

(65) Prior Publication Data

US 2012/0069347 A1 Mar. 22, 2012

Related U.S. Application Data

(60) Provisional application No. 61/384,019, filed on Sep. 17, 2010.

(51) Int. Cl.
*G01N 21/00* (2006.01)
*G01B 9/02* (2006.01)

(52) U.S. Cl.
USPC .......................................... 356/73.1; 356/477

(58) Field of Classification Search
USPC .............. 356/73.1, 477; 385/12, 13; 65/377, 65/378
See application file for complete search history.

(56) References Cited

U.S. PATENT DOCUMENTS

| | | | |
|---|---|---|---|
| 5,513,004 A | 4/1996 | Naqwi et al. | |
| 6,389,187 B1 | 5/2002 | Greenaway et al. | |
| 6,591,025 B1 | 7/2003 | Siems et al. | |
| 6,738,146 B2 * | 5/2004 | Groenewoud et al. | 356/496 |
| 6,924,890 B1 * | 8/2005 | Vobian et al. | 356/73 |
| 8,265,431 B2 * | 9/2012 | Childers et al. | 385/13 |
| 2007/0297711 A1 | 12/2007 | Childers et al. | |
| 2011/0228260 A1 * | 9/2011 | Yablon | 356/73.1 |

FOREIGN PATENT DOCUMENTS

JP  2008-215889  9/2008

OTHER PUBLICATIONS

International Search Report and Written Opinion mailed Apr. 23, 2012 in corresponding Application No. PCT/US2011/051711.

* cited by examiner

*Primary Examiner* — Michael A Lyons
(74) *Attorney, Agent, or Firm* — Nixon & Vanderhye P.C.

(57) ABSTRACT

An interferometric measurement system includes a spun optical fiber including multiple optical waveguides configured in the fiber. Interferometric detection circuitry detects measurement interferometric pattern data associated with each of the multiple optical waveguides when the optical fiber is placed into a bend. Data processing circuitry determines compensation parameters that compensate for variations between an optimal configuration of the multiple optical waveguides in the fiber and an actual configuration of multiple optical waveguides in the fiber. The compensation parameters are stored in memory for compensating subsequently-obtained measurement interferometric pattern data for the fiber. The compensation parameters are applied to the subsequently-obtained measurement interferometric pattern data in order to distinguish between axial strain, bend strain, and twist strain on the fiber and to accurately determine one or more strain values for the fiber corresponding to one or more of the axial strain, bend strain, or twist strain on the fiber.

29 Claims, 15 Drawing Sheets

COMPENSATING FOR NON-IDEAL MULTI-CORE OPTICAL FIBER STRUCTURE

PRIORITY APPLICATION

This application claims priority from U.S. provisional patent application Ser. No. 61/384,019, filed on Sep. 17, 2010, the contents of which are incorporated herein by reference.

TECHNICAL FIELD

The technology relates to interferometric measurements and may be used for example in optical fiber shape and/or position sensing applications.

INTRODUCTION

Optical strain sensing is a technology useful for measuring physical deformation of a waveguide caused by, for example, the change in tension, compression, or temperature of an optical fiber. A multi-core optical fiber is composed of several independent waveguides embedded within a single fiber. A continuous measure of strain along the length of a core can be derived by interpreting the optical response of the core using swept wavelength inteferometery. With knowledge of the relative positions of the cores along the length of the fiber, these independent strain signals may be combined to gain a measure of the strain profile applied to the multi-core optical fiber. The strain profile of the fiber refers to the measure of applied bend strain, twist strain, and/or axial strain along the length of the fiber at a high (e.g., less than 50 micrometers) sample resolution. In a technique known as optical position and/or shape sensing detailed in commonly-assigned U.S. patent application to Froggatt et al., entitled "Optical Position and/or Shape Sensing," application Ser. No. 12/874,901, filed on Sep. 2, 2010, which is incorporated herein by reference, this strain profile information can be used to reconstruct the three dimensional position of the fiber.

In performing position measurements of the fiber using this technique, accuracy is limited by how well the strain signals from the independent optical cores can be recombined. Further, if accuracy levels are required that are for example less than 0.05% of the length of the measurement fiber, compensation for these variations is important. An ideal structure for this purpose occurs when the core waveguides are located exactly as specified by the design of the fiber after manufacture, and the physical properties of the cores are identical. But in practice, manufacturing processes are not capable of producing an ideal fiber structure. Therefore, variations, such as in core location, length, and index of refraction, are observed in actual fiber structures. Unfortunately, variations from an ideal fiber structure cannot be physically measured to this desired degree of accuracy by any known technique.

SUMMARY

An interferometric measurement system is provided for measuring a spun optical fiber including multiple optical waveguides configured in the fiber. Interferometric detection circuitry detects measurement interferometric pattern data associated with each of the multiple optical waveguides when the spun optical fiber is placed into a bend. The bend is preferably a continuous bend in a plane. Data processing circuitry determines compensation parameters that compensate for variations between an optimal configuration of the multiple optical waveguides in the spun optical fiber and an actual configuration of multiple optical waveguides in the spun optical fiber based on the detected measurement interferometric pattern data. An "optimal configuration" includes for example a configuration intended by design, a configuration for a particular use, a desired configuration, or an unknown configuration. A memory stores the compensation parameters for compensating subsequently-obtained measurement interferometric pattern data for that fiber.

Examples of compensation parameters may include a cross-sectional radial distance and a cross-sectional radial rotation angle for each of the multiple optical waveguides in the spun optical fiber. For example, the actual configuration of multiple optical waveguides in the spun optical fiber may be based on an interferometric measurement of the optical fiber under strain, and the compensation parameters may include (1) a radial distance difference between an actual cross-sectional radial distance and an optimal cross-sectional radial distance for each of the multiple optical waveguides in the fiber and (2) a cross-sectional rotation angle difference between an actual cross-sectional rotation angle and an optimal cross-sectional rotation angle for each of the multiple optical waveguides in the fiber. Again, the term "optimal" includes both known and unknown fiber parameters. The detailed non-limiting examples provided in the description relate to desired or design fiber parameters as would be the case when the optimal fiber parameters are know. But the technology in this application may also be used to determine the actual fiber parameters of an unknown fiber, i.e., a situation where there is no known or desired set of fiber parameters.

In a non-limiting example embodiment, one of the multiple optical waveguides in the fiber is identified as a reference waveguide. The data processing circuitry determines a complex spin signal for each of the multiple optical waveguides in the fiber. Each complex spin signal is compared to a reference complex spin signal, and individual waveguide radial and angular positions are determined relative to the reference waveguide. Preferably, the individual waveguide radial positions are determined with an accuracy of tens of nanometers and individual waveguide angular positions are determined with an accuracy to a tenth of a degree.

Clearly, this approach does not require any prior knowledge as to the cross-sectional position of the individual waveguides. A waveguide can be positioned anywhere within the cross-section of the fiber and a measure of radial and angular positions relative to the reference waveguide can be achieved without a loss in positional accuracy. Further, any number of waveguides can be located using this technique. This allows the successful evaluation of any number of spun optical fiber designs with various waveguide geometries.

One non-limiting, example data processing implementation Fourier transforms the measurement interferometric pattern data associated with each of the multiple optical waveguides. From that Fourier Transformed measurement interferometric pattern data a spin frequency for each of the multiple optical waveguides is located and extracted. The spin frequency for each of the multiple optical waveguides is inverse Fourier transformed to generate a corresponding complex spin signal. The complex spin signals are processed to determine a radial distance compensation parameter and an angular compensation parameter for each of the multiple optical waveguides.

One or more other example compensation parameters may be determined that compensate for variations between differences in length between the multiple optical waveguides and/or for variations between indices of refraction between the multiple optical waveguides.

In one example embodiment, the data processing circuitry applies the compensation parameters to the detected measurement interferometric pattern data in order to distinguish between axial strain, bend strain, and twist strain on the spun optical fiber and to accurately determine one or more strain values for the fiber corresponding to one or more of the axial strain, bend strain, or twist strain on the spun optical fiber. A shape of the spun optical fiber is then based on the determined one or more strain values for the spun optical fiber corresponding to one or more of the axial strain, bend strain, or twist strain on the spun optical fiber.

Another aspect of the technology relates to an interferometric measurement system that uses compensation parameters previously determined for a spun optical fiber that includes multiple optical waveguides configured in the fiber. The compensation parameters are provided to compensate for variations between an optimal configuration of the multiple optical waveguides in the spun optical fiber and an actual configuration of multiple optical waveguides in the spun optical fiber have been previously determined and preferably stored. Interferometric detection circuitry detects measurement interferometric pattern data associated with each of the multiple optical waveguides when the optical fiber is under a strain. Data processing circuitry applies the compensation parameters to the detected measurement interferometric pattern data in order to distinguish between axial strain, bend strain, and twist strain on the fiber and to accurately determine one or more strain values for the fiber corresponding to one or more of the axial strain, bend strain, or twist strain on the fiber. In one advantageous example application, the data processing circuitry determines a shape of the optical fiber based on the determined one or more strain values for the fiber corresponding to one or more of the axial strain, bend strain, or twist strain on the fiber.

Another aspect of the technology includes a non-transitory, computer-readable storage medium for use in an interferometric measurement system for measuring a spun optical fiber including multiple optical waveguides configured in the fiber. The non-transitory, computer-readable storage medium stores a computer program with instructions that provide a computer-based interferometric measurement system with compensation parameter information that compensates for variations between an optimal configuration of the multiple optical waveguides in the spun optical fiber and an actual configuration of multiple optical waveguides in the spun optical fiber determined based on detected measurement interferometric pattern data for the spun optical fiber positioned in a bend.

Another aspect of the technology includes an interferometric measurement method for measuring a spun optical fiber including multiple optical waveguides configured in the fiber. Measurement interferometric pattern data associated with each of the multiple optical waveguides is detected when the spun optical fiber is placed into a bend. Data processing circuitry determines compensation parameters that compensate for variations between an optimal configuration of the multiple optical waveguides in the spun optical fiber and an actual configuration of multiple optical waveguides in the spun optical fiber based on the detected measurement interferometric pattern data. The compensation parameters for compensating subsequently-obtained measurement interferometric pattern data for the fiber are stored in memory for subsequent use.

DETAILED DESCRIPTION

Figure 1:
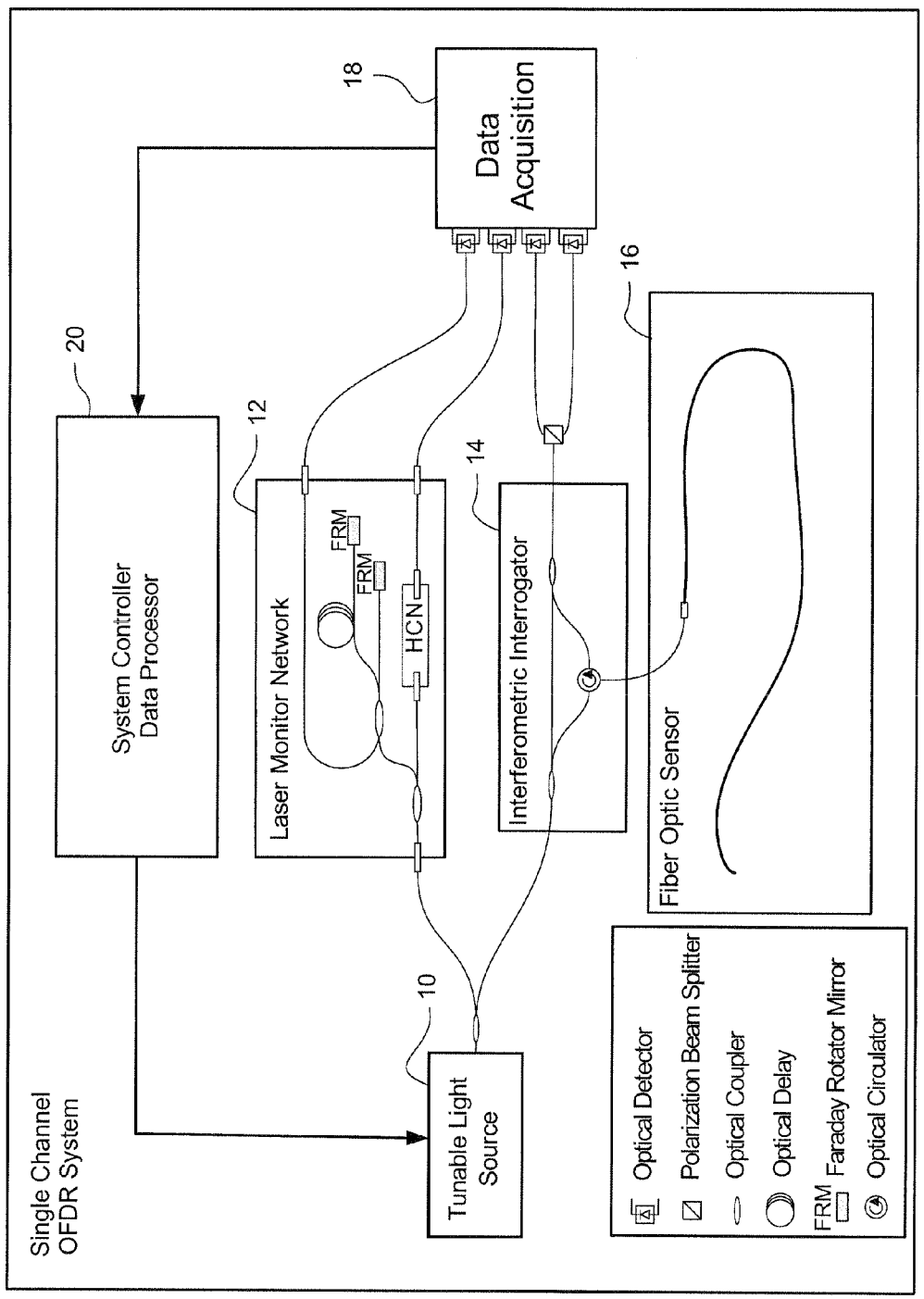
FIG. 1 shows an example of an OFDR-based distributed strain measurement system.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Optical time domain measurements with high resolution and high sensitivity may be achieved using Optical Frequency Domain Reflectometry (OFDR). These measurements enable several important fiber-optic sensing technologies, such as distributed strain sensing. Distributed strain measurements performed upon a multi-core optical fiber permit determination of a three dimensional position of the fiber as detailed in the Optical Position and/or Shape Sensing application Ser. No. 12/874,901, filed on Sep. 2, 2010 mentioned in the introduction. A multiple channel OFDR is connected to several independent optical waveguides, or cores, within the multi-core optical fiber. The strain responses of these waveguides are simultaneously measured as the fiber is placed in a given configuration. The relative positions of the waveguides along the length of the multi-core optical fiber allow determination of a strain profile of the multi-core optical fiber. As will be demonstrated below, determining the strain profile of the fiber means that the following can be isolated and individually determined: (1) axially-applied strain, (2) bend-induced strain, and (3) strain resulting from twisting along the entire length of the multi-core optical fiber. The strain profile may be used to determine the three dimensional position of the fiber, or one or more of the components (1)-(3) of this profile may be used independently.

The accuracy during the reconstruction of the strain profile of the fiber is limited by (1) the relative locations of the cores with respect to the cross section of the fiber, (2) the difference in physical length of the cores, and (3) inteferometeric metric core measurements being susceptible to the physical properties of that core, such as the index of refraction. Compensation for variation in index of refraction provides a better interpretation of independent strain signals. An ideal multi-core fiber structure refers to the case where the core waveguides are located exactly as specified by the design of the fiber after manufacture, and the optical properties of the cores are identical. But in practice, manufacturing processes are not capable of producing an ideal fiber structure, and therefore variations occur, such as variations in core location. As the applications of fiber-optic sensing expand and the fiber is placed into more demanding configurations (bend radius<50 millimeters) compensation for these variations is important. The technology described below provides a way to measure variation(s) from an ideal multi-core fiber structure and subsequently uses them to construct a more accurate strain profile of the multi-core optical fiber. The technology also may be used to determine a configuration of an unknown multi-core fiber.

Figure 2:
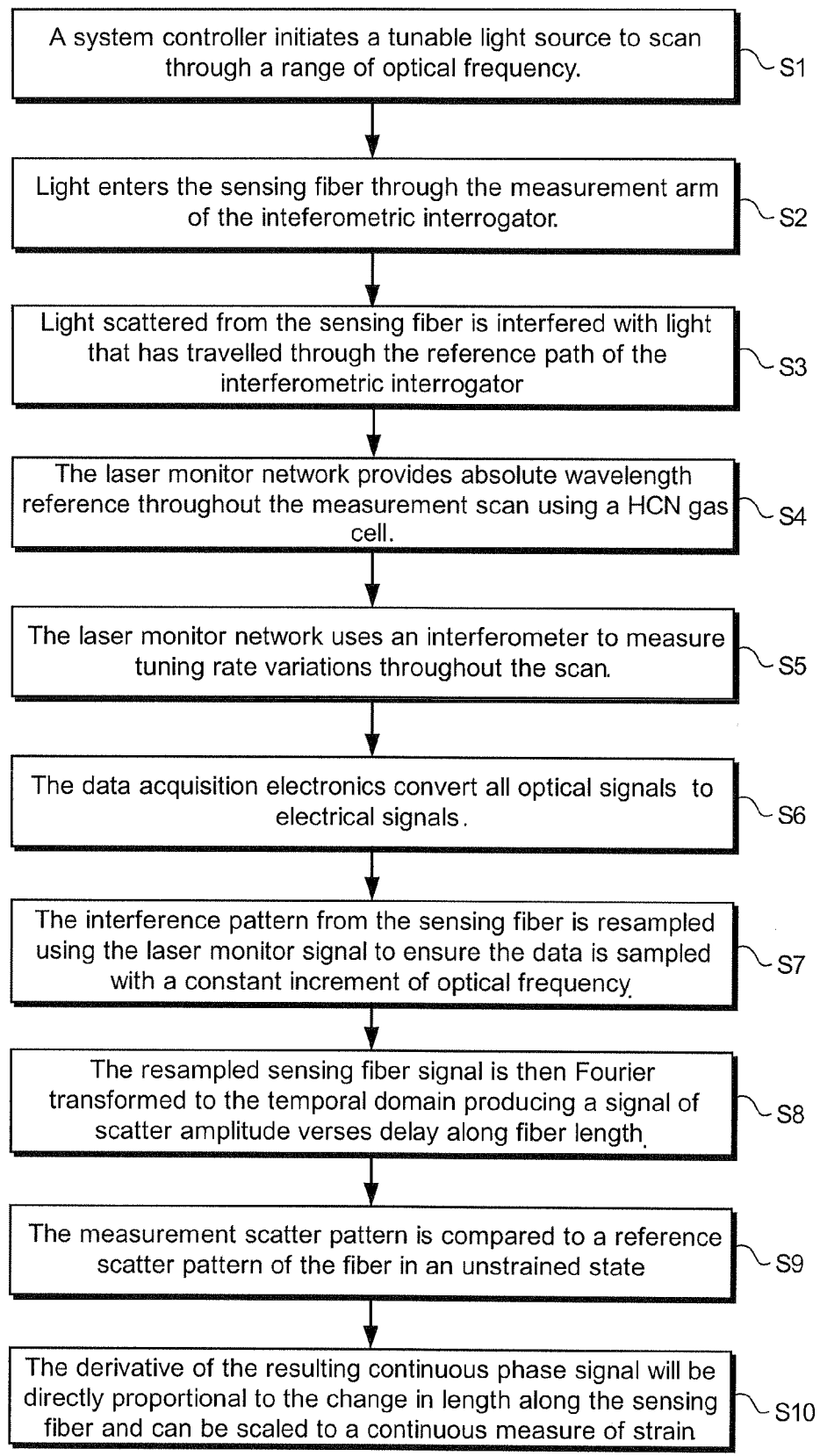
FIG. 2 is a flowchart illustrating example procedures for distributed strain measurement system using OFDR.

An OFDR-based distributed strain sensing system includes a light source, an interferometric interrogator, a laser monitor network, an optical fiber sensor, acquisition electronics, and a data processor as depicted in an example single channel OFDR system in FIG. 1. Single channel corresponds to a single fiber core. An overview of a distributed strain measurement using an OFDR system is described in a flow chart in FIG. 2.

During an OFDR measurement, a tunable light source 10 is swept through a range of optical frequencies (step S1). This light is split with the use of optical couplers and routed to two separate interferometers. The first interferometer serves as an interferometric interrogator 14 and is connected to a length of sensing fiber 16. Light enters the sensing fiber 16 through the measurement arm of the interferometric interrogator 14 (step S2). Scattered light from the sensing fiber 16 is then interfered with light that has traveled along the reference arm of the interferometric interrogator 14 (step S3). The laser monitor network 12 contains a Hydrogen Cyanide (HCN) gas cell that provides an absolute wavelength reference throughout the measurement scan (step S4). The second interferometer, within a laser monitor network 12, is used to measure fluctuations in tuning rate as the light source is scanned through a frequency range (step S5). A series of optical detectors (e.g., photodiodes) convert the light signals from the laser monitor network, gas cell, and the interference pattern from the sensing fiber to electrical signals (step S6). A data processor in a data acquisition unit 18 uses the information from the laser monitor 12 interferometer to resample the detected interference pattern of the sensing fiber 16 so that the pattern possesses increments constant in optical frequency (step S7). This step is a mathematical requisite of the Fourier transform operation. Once resampled, a Fourier transform is performed by the system controller 20 to produce a light scatter signal in the temporal domain (step S8). In the temporal domain, the amplitudes of the light scattering events are depicted verses delay along the length of the fiber. Using the distance that light travels in a given increment of time, this delay can be converted to a measure of length along the sensing fiber. In other words, the light scatter signal indicates each scattering event as a function of distance along the fiber. The sampling period is referred to as the spatial resolution and is inversely proportional to the frequency range that the tunable light source 10 was swept through during the measurement. As the fiber is strained, the local light scatters shift as the fiber changes in physical length. These distortions are highly repeatable. Hence, an OFDR measurement of detected light scatter for the fiber can be retained in memory that serves as a reference pattern of the fiber in an unstrained state. A subsequently measured scatter signal when the fiber is under strain may then be compared to this reference pattern by the system controller 20 to gain a measure of shift in delay of the local scatters along the length of the sensing fiber (step S9). This shift in delay manifests as a continuous, slowly varying optical phase signal when compared against the reference scatter pattern. The derivative of this optical phase signal is directly proportional to change in physical length of the sensing core (step S10). Change in physical length may be scaled to strain producing a continuous measurement of strain along the sensing fiber.

Figure 3:
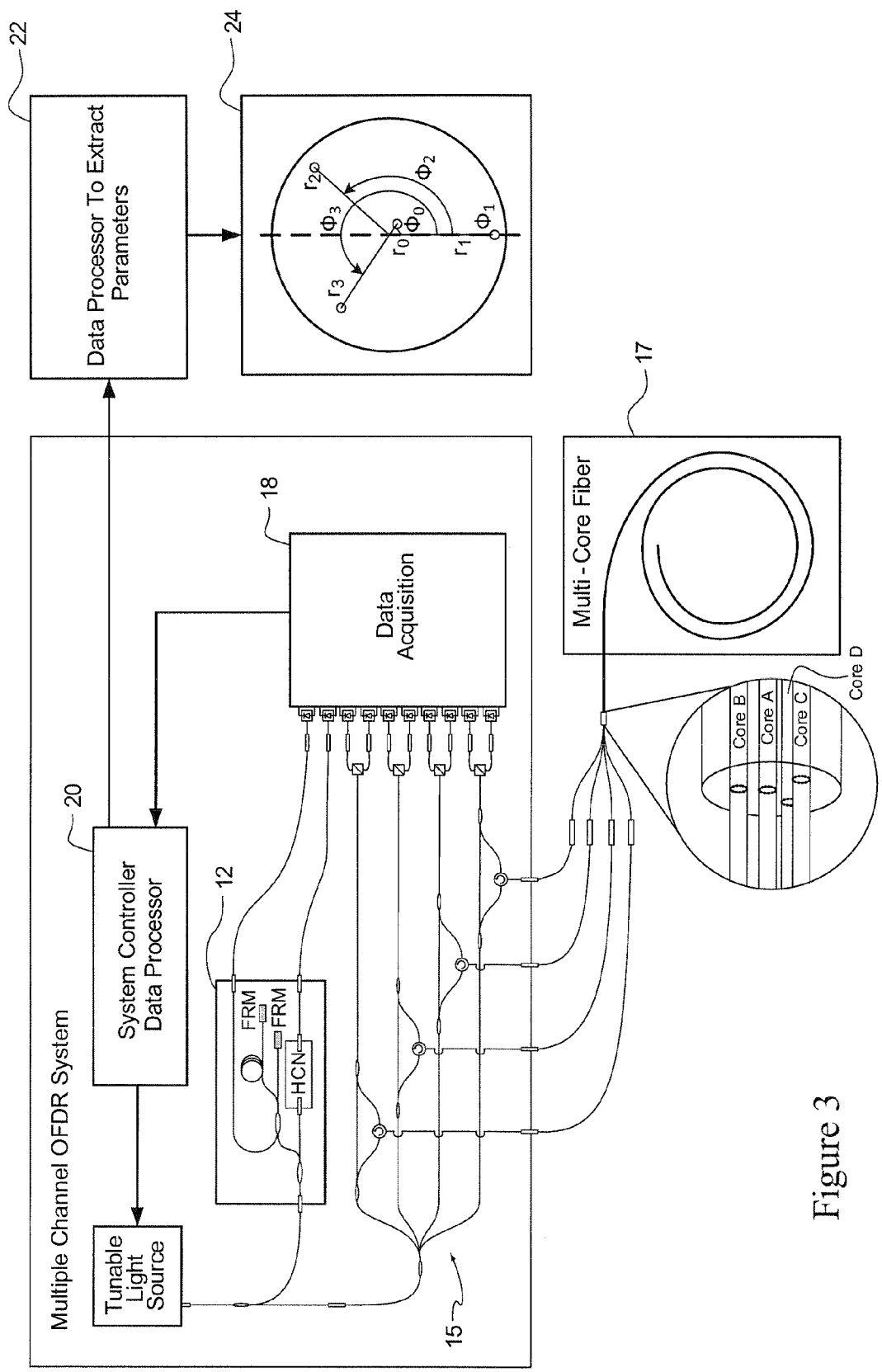
FIG. 3 shows an example of an OFDR-based system for optically measuring and calibrating a multi-core optical fiber.

FIG. 3 shows a multi-channel OFDR-based distributed strain sensing system for measuring a multi-core optical fiber 17 which is similar to the single channel OFDR-based distributed strain sensing system in FIG. 1. Instead of one interferometric interrogator 14 in FIG. 1, there are four interferometric interrogators referenced generally at 15 corresponding to four core waveguides A, B, C, and D in the fiber 17. Although the term core is used below, the technology applies to other types of waveguides that can be used in a spun fiber. Each of the interferometric interrogators at 15 is connected to the tunable light source 10 via optical couplers. Each independent waveguide within the multi-core optical fiber is then connected to an interferometric interrogator. Each pairing of an interferometric interrogator with a waveguide in the multi-core fiber is referred to as an acquisition channel. As the tunable light source 10 is swept, each channel is simultaneously measured, and the resulting interference pattern from each channel is routed to the data acquisition electronics 18 adapted for the additional interferometers 15. Each channel is processed independently and identically as described in the flowchart in FIG. 2. The distributed strain measurements recorded using a multiple-channel OFDR system from the waveguides may then be exported for use or for further processing.

FIG. 3 also includes a data processor 22 coupled to the system controller 20 for extracting parameters 24 relating to the actual physical configuration of the cores A, B, C, and D in fiber 17 that are used to calibrate or otherwise compensate the OFDR measurements to account for the variations between the actual optical core configuration and an optimal optical core configuration.

In the following description, a model is first established that depicts parameters that describe variations from an optimal multi-core fiber configuration, where the term "optimal" includes known and unknown configurations. Later, parameters are defined that compensate for variation in the physical properties of the optical cores within the multi-core fiber. Mathematics are presented that explain how these parameters are utilized to reconstruct a more accurate strain profile of the fiber. The mathematics presented below relate to one non-limiting example approach. Other permutations may be derived and employed. Steps to extract and/or use the parameters from the distributed strain measurements of a multiple channel OFDR system are described.

Figure 4:
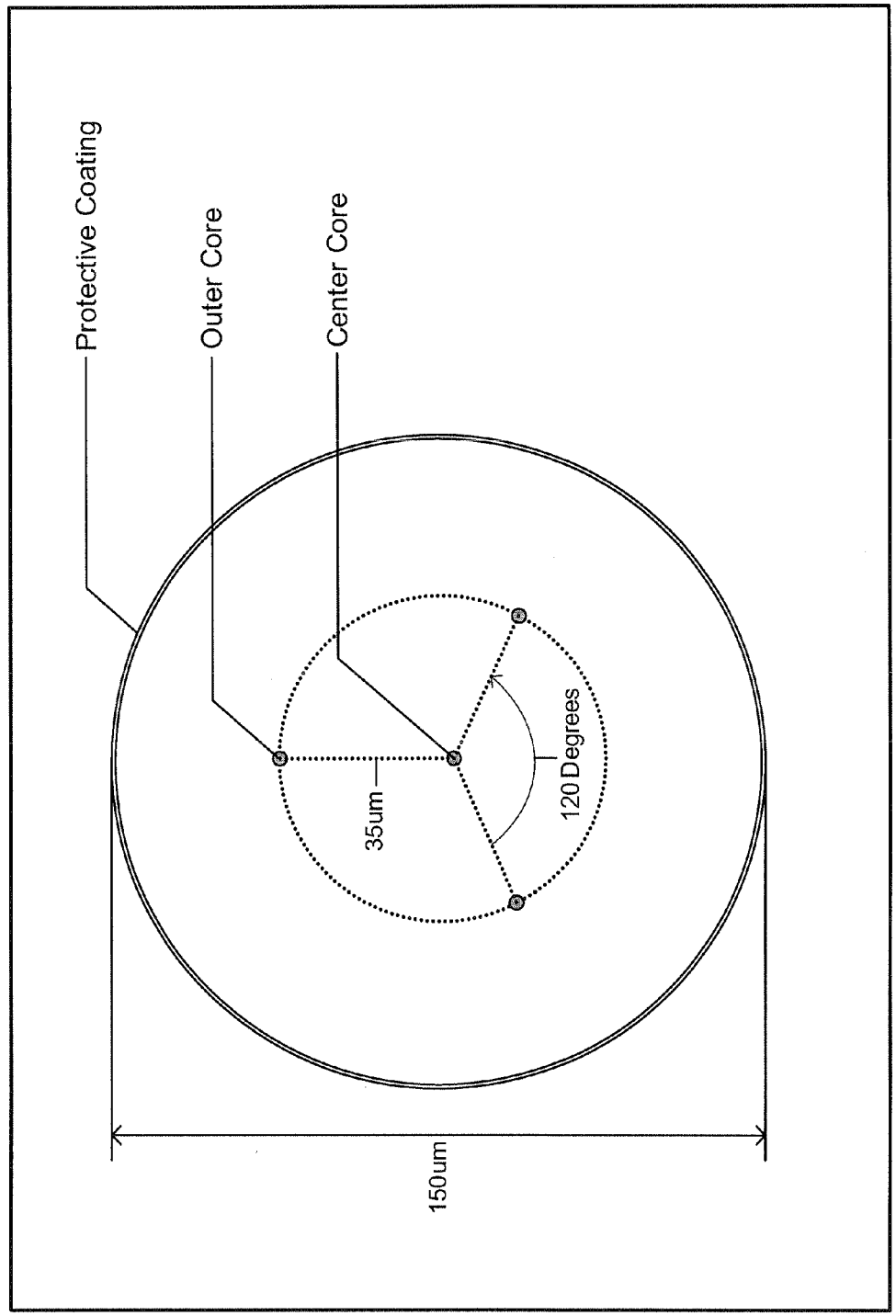
FIG. 4 shows an example cross section of a multi-core shape sensing fiber.
Figure 5:
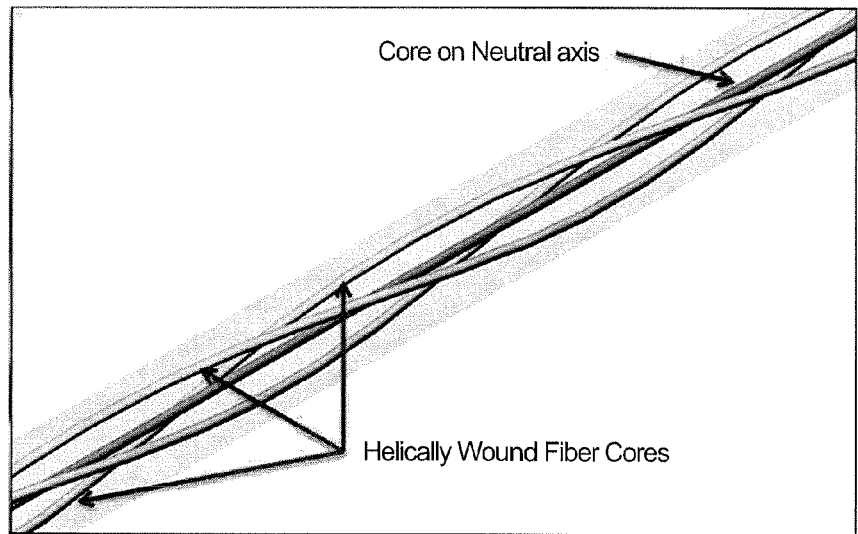
FIG. 5 shows helical wrapping of the outer cores about the center core along the length of the multi-core fiber.

A multi-core optical fiber that can be used for example in shape sensing applications includes a center core located along the central axis of the fiber and at least three outer cores located concentrically about the center axis at a given radial distance. Other waveguide geometries may be used that are equally as functional as the example configuration. Although this example configuration is easily manufactured and highly sensitive to the signals required for shape sensing applications, it is just an example. FIG. 4 shows a cross section of a non-limiting example multi-core shape sensing fiber. The outer cores are then helically-wrapped at a spin rate, the number of rotations per meter, about the center axis along the length of the fiber. FIG. 5 shows a spun optical fiber with helical wrapping of the outer cores about a center core along the length of the multi-core fiber. For example, a spun multi-core fiber could be manufactured with a spin rate of 60 turns per meter. The center core is located along the neutral axis of the fiber, and this core does not experience strain as a result of the fiber being bent. Conversely, the outer cores are offset from the central axis by a given radial distance, in this example case, 35 micrometers. Due to the helical wrapping of the outer cores, a measured outer core will experience either elongation or compression depending on its orientation to the curvature of the fiber when the fiber is bent. When the fiber is placed into a continuous bend in a single direction, the strain signal of an outer core will oscillate between elongation and compression at a rate equal to the spin rate of the helical wrapping of the outer cores.

Figure 6:
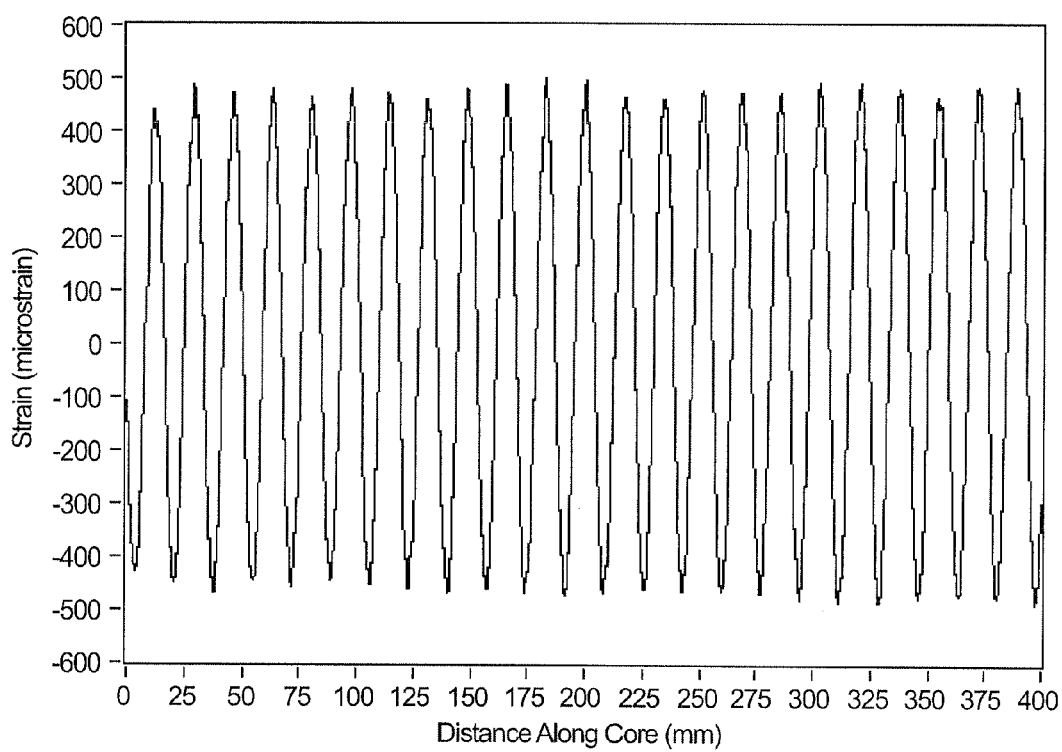
FIG. 6 is a graph showing an example of a strain signal measured in an outer core of the multi-core fiber alternating between compression and elongation at a period equal to the inverse of the spin rate of the fiber.

FIG. 6 is a graph showing an example of a strain signal measured in an outer core of the multi-core fiber alternating between compression and elongation at a period equal to the inverse of the spin rate of the fiber. An example strain signal of an outer core placed into a continuous bend of radius 14.5 centimeters is depicted in FIG. 3.

Because the outer cores of a spun fiber are helically-wrapped, the outer cores also experience strain as a result of a twist applied to the fiber. The outer cores are either elongated or compressed in response to the orientation of the twist to the direction of the helical wrapping. In other words, looking down the axis of the fiber with the outer cores being helically wrapped clockwise, an applied twist in the clockwise direction causes the outer cores to become compressed. Conversely, a counter-clockwise applied twist causes the outer cores to elongate (experience tension). But the center core does not experience strain as a result of twist because it is placed along the neutral axis. Thus, this example multi-core fiber has sufficient degrees of freedom to allow individual determination of each of three different types of strain that can be applied to the multi-core fiber: axially-applied strain, bend-induced strain, and strain as a result of twist or torsion. Of course, not all three types of strain need to be determined. The multi-core fiber may be used, for example, simply to determine one or two of the three types of strain.

Errors and/or uncertainties arise in the determination of fiber position and/or shape—and more generally strain—due to variations in the structure of the multi-core optical fiber. The first category of variation is core placement. The core placement depicted in FIG. 4 can vary in example cases on the order of 100-500 nanometers. This variation causes both the radial separation and the angular position of a given core to differ from designed or desired ideal values or to simply be unknown. Thus, a model is needed that describes the positions of the cores with respect to the cross section of the multi-core fiber such that variations can be quantified.

As glass is a relatively hard material, it can be assumed that the geometry of the cross section of the multi-core fiber is preserved as the fiber is strained. This assures that the relative positions of the cores within a given cross section remain constant as the fiber is strained. This means that the fiber can be strained and still be used to accurately determine variations in core placement from the ideal configuration. A core position model that accounts for variation in core placement is depicted in FIG. 7.

Figure 7:
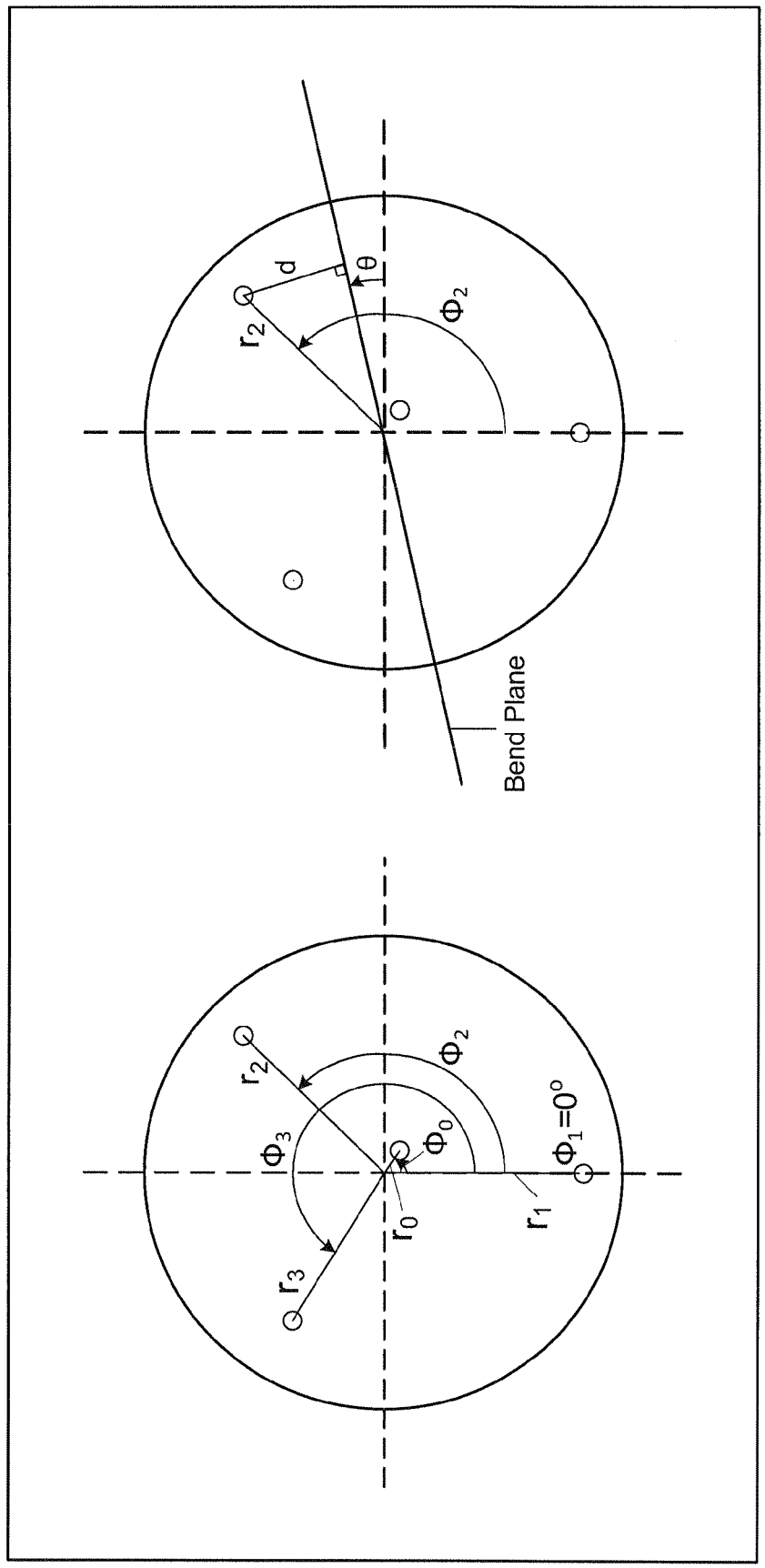
FIG. 7 illustrates parameters that can be used to quantify core placement and a response to strain.

In FIG. 7, four independent optical cores are shown displaced from their ideal core locations. A vertical axis is placed through the center of the multi-core fiber such that it passes through one of the outer cores. The outer core that is bisected by the vertical axis is referred to as the "reference core." Note that several parameters will be expressed relative to this core and for the rest of this document the core identified with index n=1 serves as the reference core as an example. Two parameters describe the position of a core: the radial distance from the fiber center, r, and an arbitrary angle φ measured from the established vertical axis intersecting the reference core. As the fiber is bent, the amount of bend-induced strain in a given core is directly proportional to the perpendicular distance d that a core is separated from the bend plane. This is illustrated in the right diagram for the outer core index n=2. If the bend plane is described by the angle θ, the nature of the helical wrapping of the cores within the fiber may be determined. According to distance along the length of the fiber, θ is defined by the spin frequency of the helical fiber.

It is helpful to understand how these parameters impact the three components of the strain profile of the fiber when the core strain responses are recombined. A mathematical model is established below based on the parameters shown in FIG. 7. Thus, if these parameters can be measured, they can be used to provide a more accurate recombination of the strain profile of the multi-core optical fiber. It is notable that these parameters need only be measured once for a particular multi-core optical fiber and may be used for some or all OFDR subsequent measurements of that same multi-core optical fiber.

As explained, the strain applied to the multi-core fiber falls into three types or categories: bend-induced strain, strain as a result of torque, and axially-applied strain. The strain response of a core within the fiber possesses a component of these globally-applied strains based on its position in the multi-core fiber. The strain response e of a core at a distance along the fiber can be represented by equation (1) below:

$$\epsilon_n = B_n(z) + R_n(z) + A_n(z) \quad (1)$$

in which n designates a core within the fiber, z represents an index along the fiber length, B is the strain experienced by the core due to bending of the fiber, R is the strain induced in the core by twist or torsion applied to the fiber, and A represents axial strain experienced by the core. Compensation for variation in core placement can be achieved by rewriting the expression in equation (1) in terms of the position of the core using the model parameters established in FIG. 7 described above. First, the bend strain B perceived by a core as a result of bending of the fiber can be shown to be proportional to curvature of the bend and the tangential distance of the core to the bend plane in Equation (2) below:

$$B_n(z) = \alpha K(z) d_n(z) \quad (2)$$

in which α is a constant, K is the curvature of the fiber, and d represents the tangential distance of the core from the bend plane. From the model in FIG. 4, the tangential distance can be expressed in terms of the core's position as:

$$d_n(z) = r_n[\sin(\phi_n)\cos(\theta(z)) - \cos(\phi_n)\sin(\theta(z))] \quad (3)$$

in which r is the radial distance from the axis of the fiber, φ represents the angle measured from the vertical axis, and θ is a measure of the angle between the bend plane and the horizontal axis. Combining equations (2) and (3) results in:

$$B_n(z) = \alpha K(z) r_n[\sin(\phi_n)\cos(\theta(z)) - \cos(\phi_n)\sin(\theta(z))] \quad (4)$$

This expression can be simplified by distributing the curvature term and expressing as two separate components:

$$B_n(z) = \alpha r_n[K_x(x)\sin(\phi_n) - K_y(z)\cos(\phi_n)] \quad (5)$$

In which $K_x$ is the curvature about the horizontal axis and $K_y$ is the curvature about the vertical axis.

For moderate levels of twist applied to a fiber (~100 Deg/meter), a first order term can be used to model strain induced by torque. Twist strain $R_n(z)$ is then expressed in terms of the core position as follows:

$$R_n(z) = \beta r_n^2 \Phi(z) \quad (6)$$

in which β is a constant, and Φ is the amount the fiber has rolled, or twisted, per unit of length. To a first order, it can also be assumed that the axial strain A experienced by the cores is common to all cores within the fiber and is not dependent on the position of the cores arriving at the expression:

$$A_n(z) = \gamma E(z) \quad (7)$$

in which γ is a constant, and E represents axial strain. Rewriting equation (1) in terms of the core positions results in the following expression:

$$\epsilon_n(z) = \alpha r_n K_x(z)\sin(\phi_n) - \alpha r_n K_y(z)\cos(\phi_n) + \beta r_n^2 \Phi(z) + \gamma E(z) \quad (8)$$

Considering the measured strain signals from the four cores in this example fiber embodiment, a matrix relationship can be constructed as follows:

$$\begin{bmatrix} \epsilon_0(z) \\ \epsilon_1(z) \\ \epsilon_2(z) \\ \epsilon_3(z) \end{bmatrix} = \begin{bmatrix} \alpha r_0 \sin(\phi_0) & -\alpha r_0 \cos(\phi_0) & \beta r_0^2 & \gamma \\ \alpha r_1 \sin(\phi_1) & -\alpha r_1 \cos(\phi_1) & \beta r_1^2 & \gamma \\ \alpha r_2 \sin(\phi_2) & -\alpha r_2 \cos(\phi_2) & \beta r_2^2 & \gamma \\ \alpha r_3 \sin(\phi_3) & -\alpha r_3 \cos(\phi_3) & \beta r_3^2 & \gamma \end{bmatrix} \begin{bmatrix} K_x(z) \\ K_y(z) \\ \Phi(z) \\ E(z) \end{bmatrix} \quad (9)$$

This expression in equation (9) allows recombination of individual strain signals of each independent core within the shape fiber, according to fiber structure variations, and sort these signals into strains that are applied to the entire multi-core fiber structure. Any number of linear combinations can be derived from equation (9) to create expressions that relate the strain response of a core to a component of the strain profile. This equation is then just an example, but it is used here in the description for illustration and because it simplifies computational requirements. These matrices are represented in shorthand notation as follows:

$$\overline{M} = \overline{P}\overline{T} \quad (10)$$

in which $\overline{M}$ represents a matrix of measured strain signals for the individual cores, $\overline{P}$ is a matrix that captures the non-ideal positions of each of the optical cores, and $\overline{T}$ is a matrix of signals that may be used in the determination of individual strain values for the three strain types, and for a shape sensing application, reconstruction of shape of the fiber. Of note, $\overline{P}$ is composed of constant values, and an inverse matrix can be found that once applied to the measured strain matrix, $\overline{M}$, produces a measure of the strain profile of the multi-core fiber.

$$\overline{P}^{-1}\overline{M} = \overline{T} \quad (11)$$

This approach allows a correction matrix, $\overline{P}^{-1}$ to be applied that compensates for a non-ideal fiber structure directly to the measured strain signals of the cores to extract the strain profile of the multi-core optical fiber (axial strain value, bend strain value, and twist strain value). This matrix $\overline{P}^{-1}$ includes constant values for the parameters depicted in FIG. 7. Thus if the position of the cores can be measured in terms of these parameters, this correction matrix $\bar{P}^{-1}$ can be used in a calibration applied to the measured strain responses of the cores to reconstruct a more accurate strain profile of the multi-core optical fiber. In fact, these parameters can be measured by placing the multi-core optical fiber into a specific configuration and comparing the strain signals as measured by a multiple channel OFDR.

Figure 8:
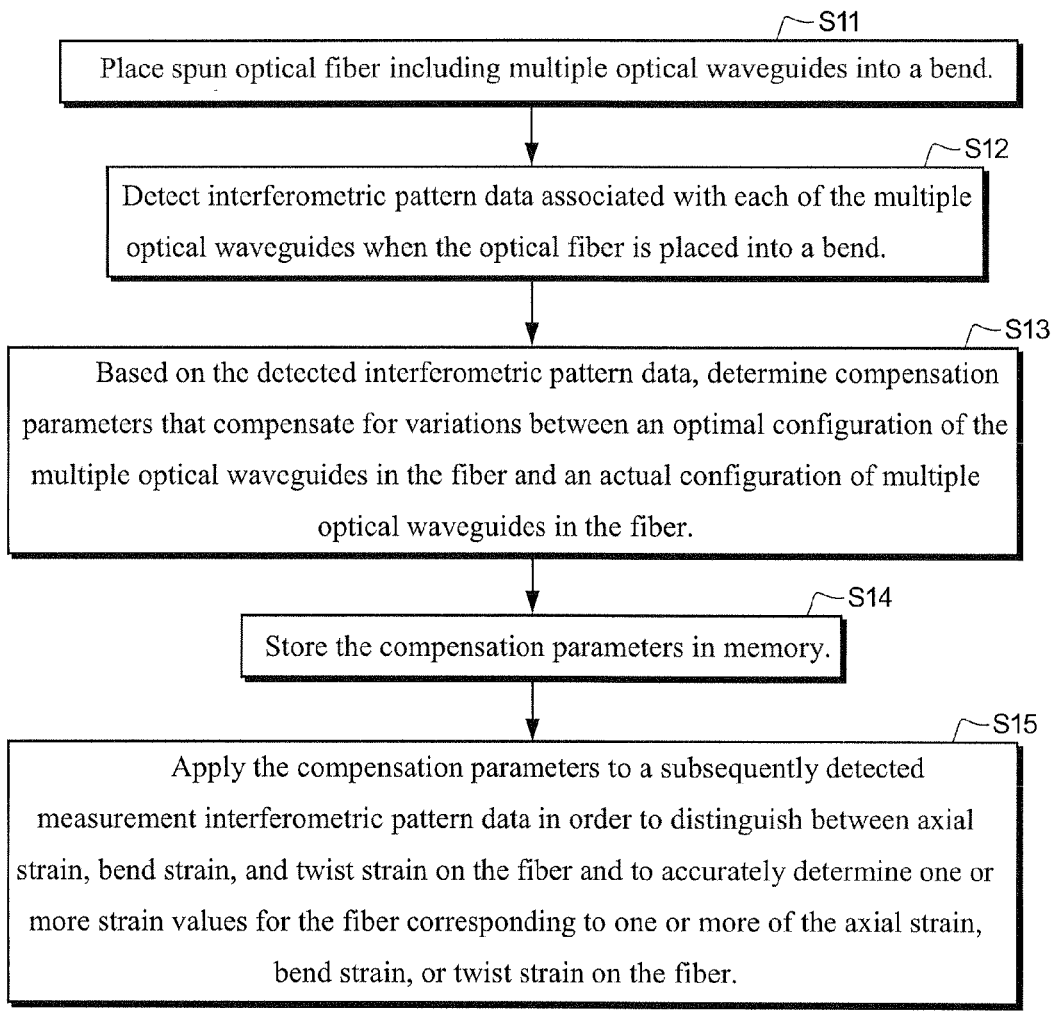
FIG. 8 is a flowchart illustrating example procedures for measuring multi-core fiber configuration parameters.

Reference is now made to the flowchart diagram in FIG. 8. A spun optical fiber including multiple optical waveguides is positioned into a bend (step S11). Interferometric pattern data associated with each of the multiple optical waveguides is detected when the optical fiber is placed into a bend (step S12). Based on the detected interferometric pattern data, compensation parameters that compensate for variations between an optimal configuration of the multiple optical waveguides in the fiber and an actual configuration of multiple optical waveguides in the fiber are determined (step S13). The compensation parameters are stored in memory (step S14). In use, the compensation parameters are applied to a subsequently detected set of measurement interferometric pattern data in order to distinguish between axial strain, bend strain, and twist strain on the fiber and to accurately determine one or more strain values for the fiber corresponding to one or more of the axial strain, bend strain, or twist strain on the fiber (step S15).

Figure 9:
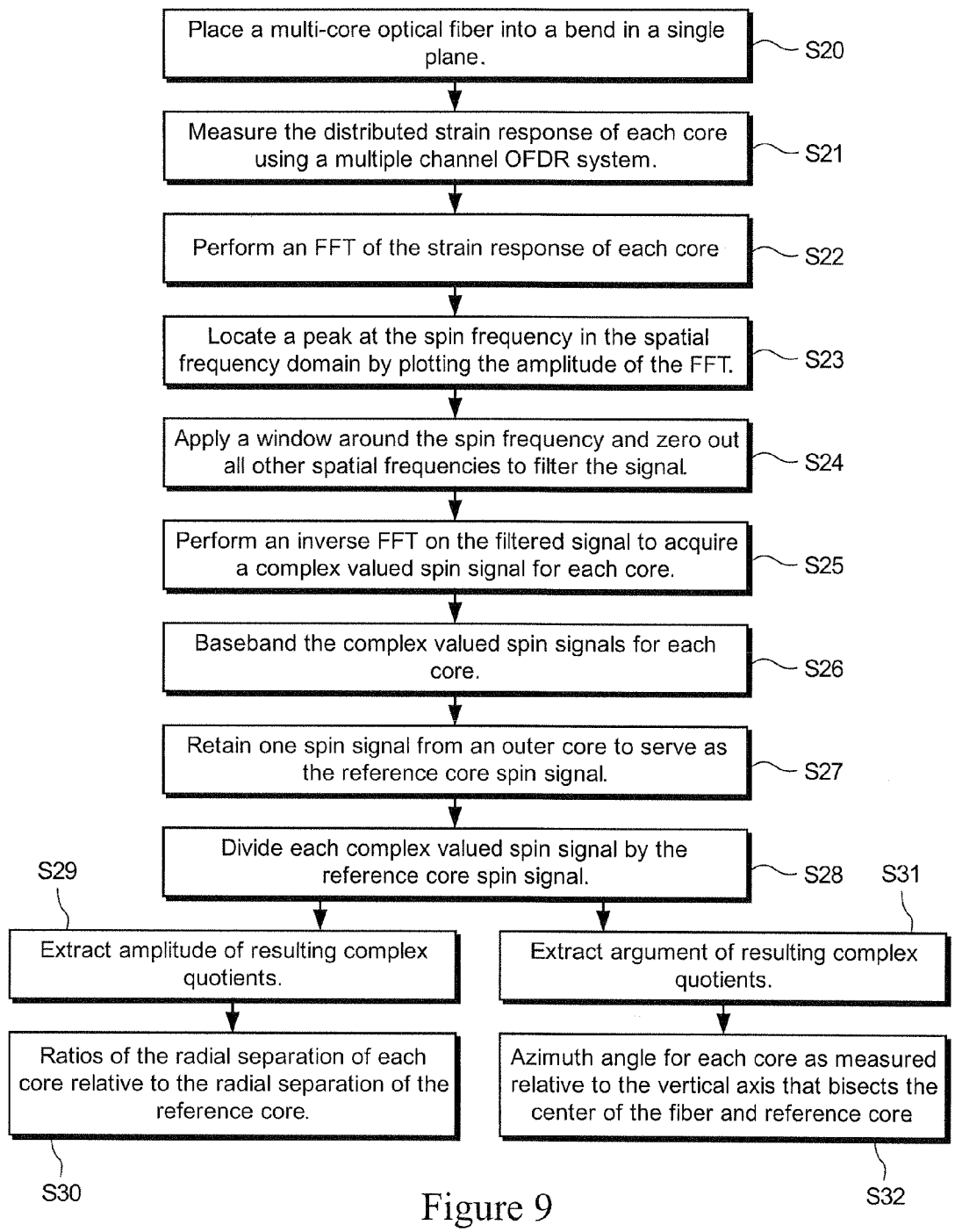
FIG. 9 is a flowchart illustrating example procedures in accordance with a non-limiting example embodiment for measuring multi-core fiber configuration parameters.
Figure 10:
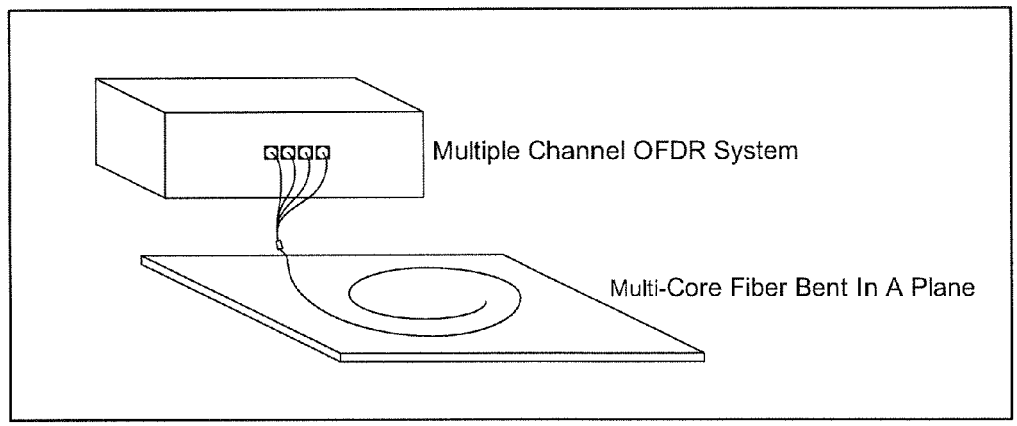
FIG. 10 shows a multi-core optical fiber being placed in an example bend in a single plane.

A specific example embodiment for measuring the parameters that describe the positions of the cores within the multi-core optical fiber is illustrated in FIG. 9. The fiber is first placed into a continuous bend in a plane (step S20). See the example in FIG. 10. The bend does not need to be of any particular shape, but greatly simplifies the processing if the bend is continuous and in a single direction. Further, it simplifies the processing if the bend is in a single plane. As an example, the fiber may be placed into a loop on a flat surface or placed into a spiral etched into a flat calibration plate. Once the fiber is placed in this configuration, a multiple channel OFDR system captures the distributed strain response of each of the waveguides within the multi-core optical fiber (step S21). The resulting strain response typically is similar to that depicted in FIG. 6 where the signal alternates between compression and elongation at a frequency that matches the spin frequency of the helical wrapping of an outer core as it proceeds through a bend. The magnitude of this oscillation should also be slowly varying along the length of the fiber as this magnitude will be proportional the bend radius of the loop described above. These strain responses are then provided to the data processor 22 for extraction of the parameters that describe variation from an ideal fiber structure.

Figure 11:
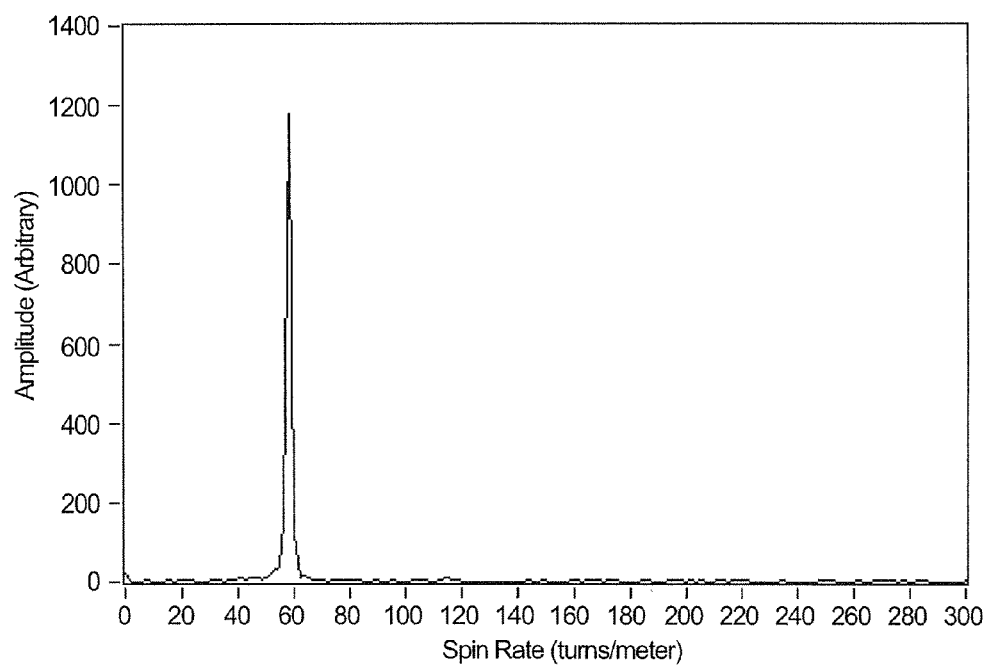
FIG. 11 is a graph showing an example of the amplitude of a Fourier transform of a strain signal from a helically wrapped multi-core fiber to show a discrete peak at the spin rate of the core.

To determine the core location, a complex-valued signal with both amplitude and phase is determined from the real-valued strain response provided by the OFDR system. This can be performed in a number of different ways, e.g., using a filtering operation. One filtering approach now described starts by Fourier transforming each core strain response measured with a multiple channel OFDR system when the fiber is placed in a continuous bend in a single plane (step S22). The amplitude of the FFT is then plotted such that a discrete peak is observed in the spatial frequency domain located at a frequency that matches the spin frequency of the fiber (step S23). An example plot of this discrete peak at the spin frequency of the fiber is depicted in FIG. 11.

In an ideal system, noise levels would not be present that could potentially distort the measurement of the core positions. But to remove noise effects, a windowing filter is centered around the spin frequency of each core's response and zeroed out for all other spatial frequencies. An inverse Fourier transform is then performed on the filtered signals (step S24). Performing a Fourier transform on the real-valued strain response of a core produces a complex-valued signal with both an amplitude and phase. This complex-valued signal is referred to as the complex spin signal of a core. The amplitude of this spin signal is proportional to the radial distance r, and the phase of this signal is determined by the azimuth angle for each core $\phi$. This complex signal, Z, can be represented in the following notation:

$$Z_n = A_n e^{i\phi_n} \tag{12}$$

in which n designates a core within the multi-core fiber, A is a measure of the amplitude which is proportional to the radial separation of a core, and $\phi$ is a measure of the relative phase of the signal based on the azimuth angle for each core. The complex signal for each core is then frequency-translated to a reference frequency, e.g., DC or baseband, so that each of the four complex spin signals is aligned at the same frequency and can be subsequently compared (step S26). The complex-valued signal from the reference core is then established, e.g., in outer core n=1 in the example (step S27). The complex-valued spin signals of the three other cores (n=0, 2, 3) are then divided by the complex-valued spin signal of the reference core (n=1) (step S28). The division generates a complex quotient that contains a relative measurement of both amplitude and angle as described in equation (13):

$$\frac{Z_n}{Z_1} = \frac{A_n e^{i\varphi_n}}{A_1 e^{i\varphi_1}} = \frac{A_n}{A_1} e^{i(\varphi_n - \varphi_1)} \tag{13}$$

The complex quotient in equation (13) has two components of interest. The amplitude of this complex quotient contains information relating the amplitudes of the two spin signals. Because the amplitude of the spin signal of a core is proportional to its radial distance from the center core, extracting the amplitude of the complex quotient (step S29) provides a measure of the ratio of radial separation of a core to the radial separation of the reference core. The constant of proportionality is the same for each core, so this ratio of amplitudes is equivalent to the ratio of radial separations as depicted in equation (14) (step S30).

$$\frac{A_n}{A_1} = \frac{ar_n}{ar_1} = \frac{r_n}{r_1} \tag{14}$$

Figure 12:
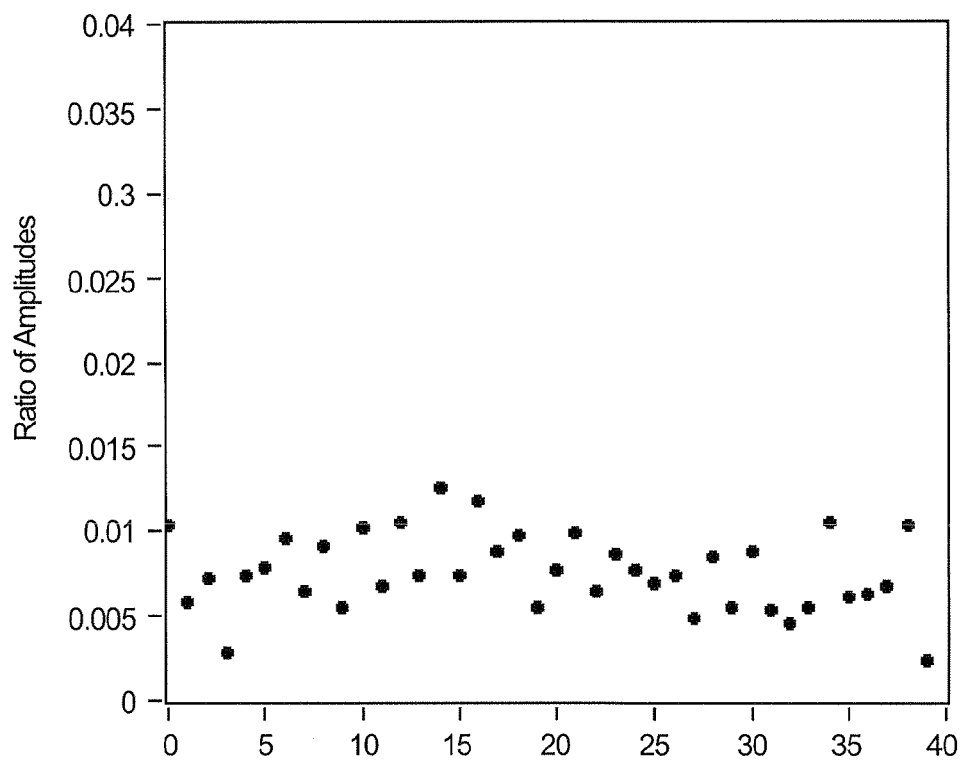
FIG. 12 is a graph showing an example of a ratio of the amplitude of the spin signal of the center core to that of the reference core.

As an example, the amplitudes are extracted from complex quotient produced from comparing the center core spin signal to the reference core. FIG. 12 shows an example graph of a ratio of the amplitude of the spin signal of the center core to that of an outer core.

In this case, the ratio of radial separations is measured to be approximately 0.007. If it was assumed that radial separation of the reference core was exactly 35 micrometers, this indicates that the center core is displaced from the center of the fiber by 245 nanometers. For the mathematical model described in equation (7), using the values of radial ratios is sufficient. As the radial ratio is defined relative to the reference core, the actual radial separation of the reference core can be accounted for in the constants $\alpha$ and $\beta$ used in equation (9). As an example, $r_0$=0.007 and $r_1$=1.0. The constants $\alpha$ and $\beta$, for a given fiber, can be extracted by placing the fiber into a bend of known radius.

The argument of the complex valued signal Z, the phase of the spin signal, is extracted (step S31). A phase shift when two phase signals are compared. In the model of the multi-core fiber depicted in FIG. 7, the vertical axis bisects a reference outer core with index n=1. If all other cores are compared to the reference core, the extracted relative phase shift equals the azimuth position φ (step S32):

$$\phi_n = L\left(\frac{Z_n}{Z_1}\right) = \varphi_n - \varphi_1 \quad (15)$$

Figure 13:
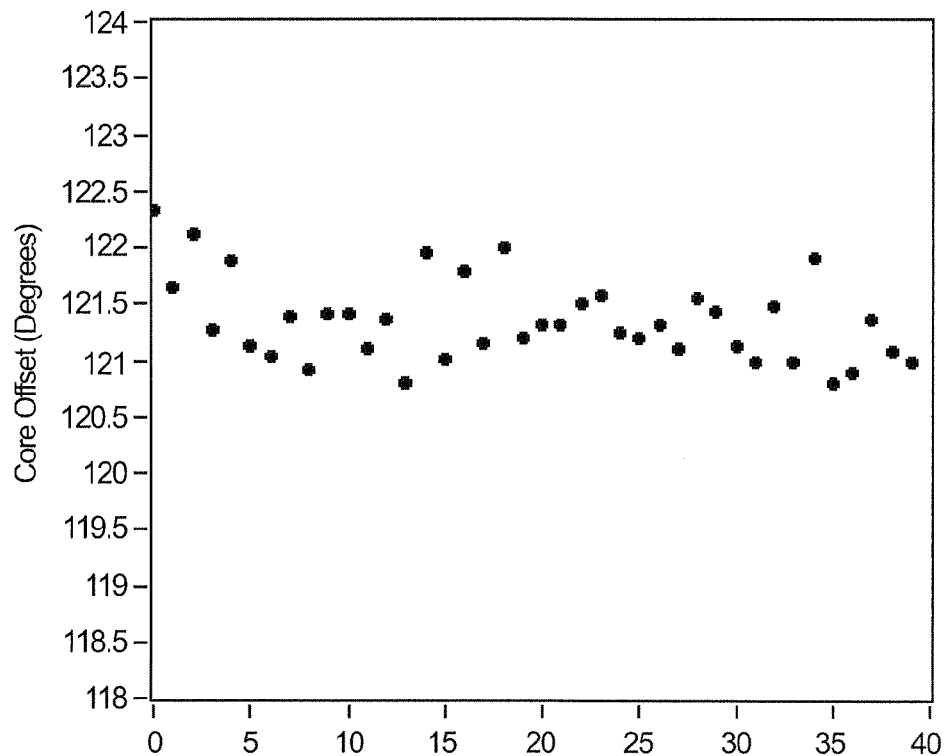
FIG. 13 is a graph showing an example of relative core offset measured by comparing the filtered spin signal of core 2 to the reference spin signal.

The plot in FIG. 13 depicts an example phase shift measured for $\phi_2$ of 121.4 degrees using the computation described in equation (13) for core n=2.

In summary, measurement of core position begins by placing the multi-core fiber into a bend in a single direction in a plane, e.g., by placing the fiber in a spiral on a flat surface. A multiple channel OFDR system measures the strain responses of the independent waveguides (cores) within the fiber. The different strain responses are provided to a data processer in which parameters that quantify variation from an ideal multi-core geometry are determined. A Fourier transform allows a filter to be applied to the measured scatter signal at the spin frequency of the helical wrapping. An inverse Fourier transform of this filtered signal produces a complex-valued spin signal. The amplitude of this complex spin signal is proportional to the radial separation distance of the core from the neutral center axis of the fiber. The phase response of the complex spin signal is based on the angular position of the core within the geometry of the fiber and is labeled φ in the model shown in FIG. 7. Comparing the complex spin signal of a core to the spin signal of a reference core determines that core's position relative to the reference core. Thus, all angular positions can be found relative to the vertical axis that bisects the reference core by extracting the argument of a complex quotient between a core's spin signal and the reference core spin signal. Extracting the amplitude provides a ratio measurement of radial separation of the core relative to the reference core. This technology requires only that the fiber be placed into a continuous bend in a plane, which makes the method ideal for a manufacturing process, and allows the core position to be determined to tens of nanometers and the angular position of a core to be determined to within a tenth of a degree.

Figure 14:
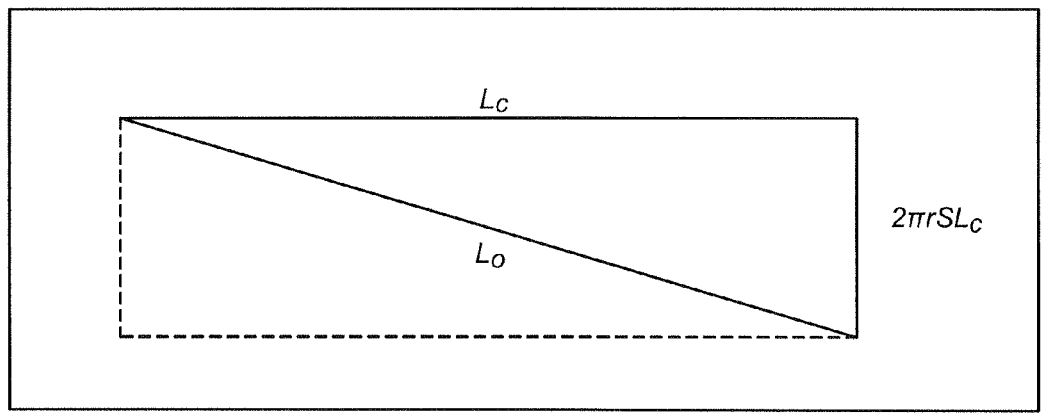
FIG. 14 is a diagram illustrating how a helically wrapped outer core must be longer than the central core.

A second variation that occurs in multi-core fiber structure is a difference in lengths of the cores. The outer cores are longer than the center core due to the helical wrapping along the length of the fiber. Imagine a length of multi-core fiber that contains only a single wrap of the outer cores. If this cylinder was sliced, and subsequently laid flat, a rectangle would be formed of which the length of the center core would equal the length of the long edge of the rectangle, the circumferential distance of a displaced outer core would equal the short edge of the rectangle, and the length of the diagonal would equal the length of an outer core as depicted in FIG. 14.

$L_c$ represents the length of the center core, $L_o$ represents the length of an outer core, r is the radial separation of an outer core, and S is the spin frequency of the helical outer cores. Since the central fiber is placed along the central axis of the fiber, the length of the center core is equal to the length of the multi-core fiber. However, as the outer core is helically wrapped at distance from the fiber axis, an outer core is physically longer than the length of the multi-core optical fiber. As an example, for a length of multi-core fiber of 1.5 meters, a radial core separation of 35 micrometers, and a spin rate of 60 turns per meter the outer cores are found to be 131 micrometers longer than the center core.

Figure 15:
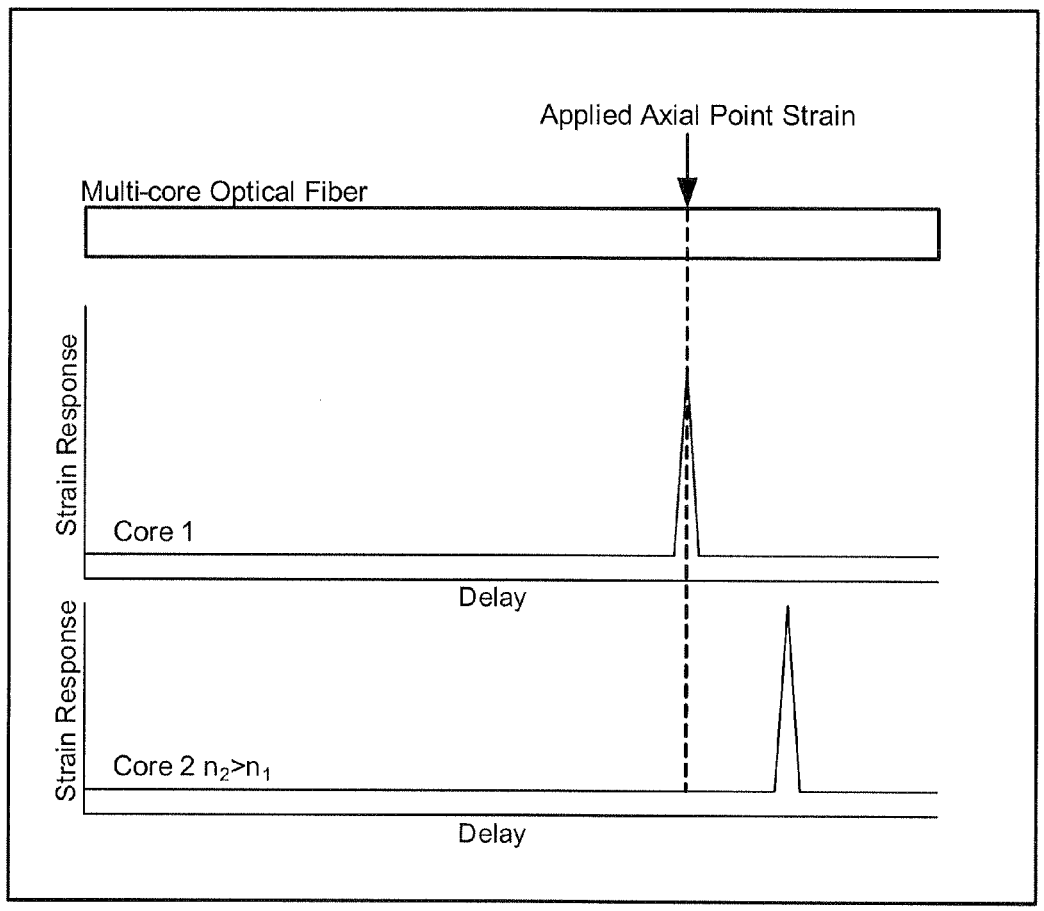
FIG. 15 is a diagram showing how a discrete axial strain will appear at a greater delay in the case that the refractive index is not constant between cores.

This creates an issue when determining the strain profile of the fiber from the independent strain signals of the cores. During an OFDR distributed strain measurement, strain is measured as seen along the length of the core. As shown above, the lengths of the cores are not equal for a given length of multi-core optical fiber. Hence, the strain responses of the cores need to be matched in length to properly determine the strain response of the multi-core optical fiber. Similar to having to know the positions of the cores within a cross section of the fiber to a high degree of accuracy, the strain signals must be aligned to a high degree of accuracy along the length of the fiber. For demanding applications, this alignment may need to be better than the spatial resolution of the measurement, e.g., 50 micrometers for some shape sensing applications. As an example, consider a point axial strain applied at a point along the length of the multi-core fiber. Due to a difference in core length, this axial strain may be perceived at a different distance, or delay, along the length of the fiber as illustrated in FIG. 15.

A third variation that occurs in multi-core fiber structure is a variation in the index of refraction between the cores within the fiber, as a consequence of non-ideal fiber manufacture, can result in subtle perceived length differences between the cores during an inteferometric-based strain measurement. The strain measurements of a given core within the fiber are performed using swept wavelength interferometry. This measurement approach will be susceptible to the optical properties of the fiber. A difference in index of refraction will cause variations in perceived time of flight of the light used during the measurement. In other words, as index of refraction varies from core to core within the fiber, the measured strain response of a core could be reported over a different length even if the lengths of the cores are identical. This index of refraction variation has been found to be on the order of 10E-6, which is sufficient to induce an apparent length difference between the cores on the order of the spatial resolution of some applications.

Figure 16:
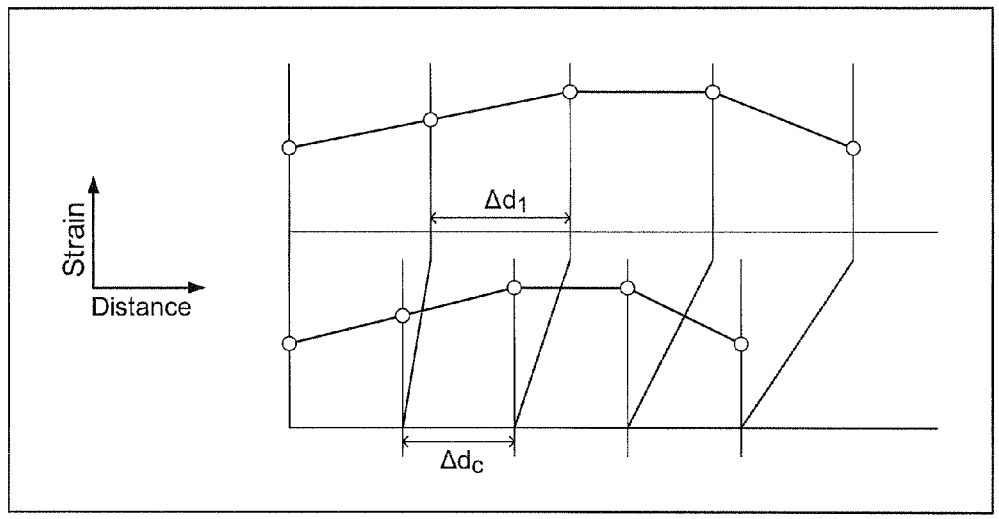
FIG. 16 illustrates resampling a strain response at a common spatial increment.

Mathematical interpolation is a non-limiting example way to account for the length differences between the measured strain responses acquired using a multiple channel OFDR. The diagram in FIG. 16 illustrates this approach conceptually.

A strain response can be resampled such that it is represented over a different length by mapping the change in strain for one spatial increment to a common spatial increment. This causes the strain response to be either elongated or compressed. This remapping can be performed with a commonplace mathematical interpolation. Consider the previous example in which an outer core was found to be 131 micrometers longer than the central core for a 1.5 meter long multi-core fiber. A common spatial increment of 40 micrometers is established based on the spatial resolution of our OFDR measurement system. This means that the strain response of the center core is sampled in this example with 37500 points while the outer core is sampled with 37503.3 points found by dividing the length of the core by the spatial resolution of the system. Thus, each spatial increment of the outer core needs to be reduced by 3.49 nanometers to map this signal to a length equal to the center core.

Index of refraction variations may be corrected in a similar manner, though other techniques may be used. During an OFDR measurement, we measure the amount of optical phase that accumulates as a result of reflected light being delayed as a given segment of fiber changes in length. This delay is then converted to a measure of length based on the distance light travels in a given increment of time. For light of wavelength 1550 nm, it can be approximated that light travels 1 meter in 5 nanoseconds. However, this approximation is based on an assumed index of refraction. For two cores of equal length, if an index variation is present, then the optical delay is greater for one core, and when converted to length, this core appears longer. This can be corrected by remapping the signals to a common spatial increment as depicted in FIG. 15.

Figure 17:
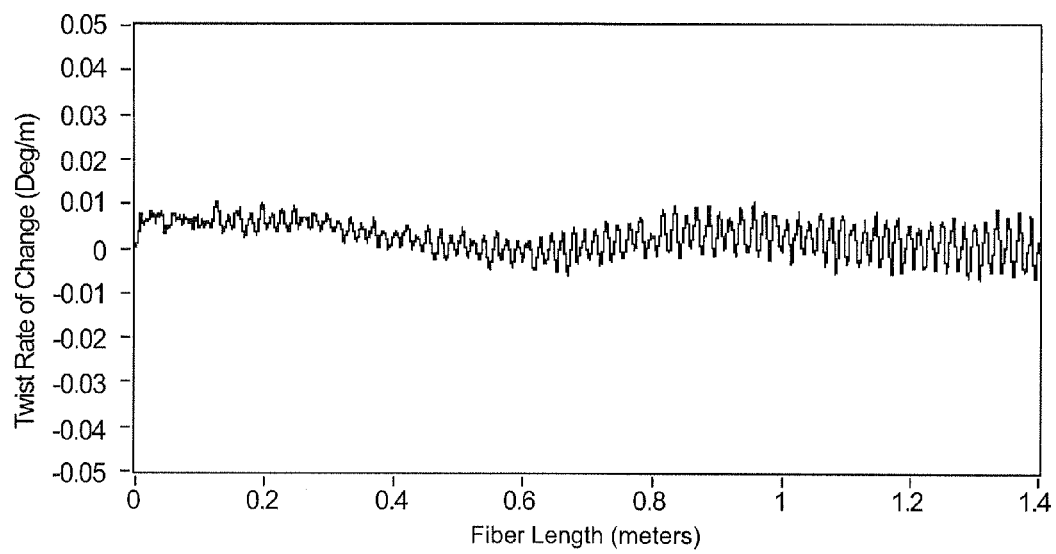
FIG. 17 shows an example derivative of a twist signal showing a mismatch in index of refraction.
Figure 18:
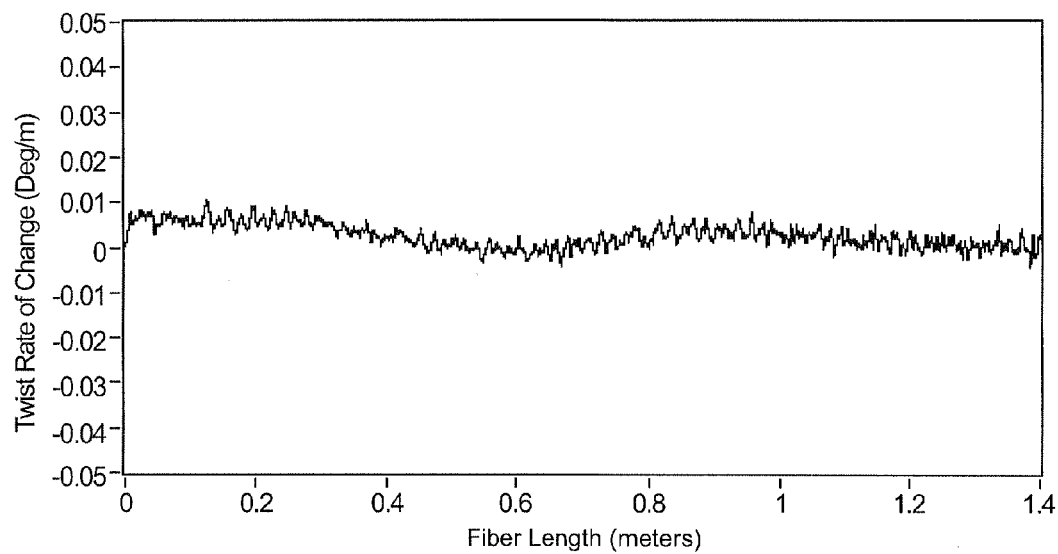
FIG. 18 is a graph showing an example twist signal for a fiber in which the strain signals are resampled such that the strain response per unit length is matched to the same increment.

The presence of a bend-induced oscillation in the twist per unit length measurement as depicted in FIG. 17 may be used as feedback to ensure proper remapping of the strain responses of the cores to a common length. Here, the twist along the length of the fiber is depicted for a fiber placed into a continuous bend in a single plane. Due to variation in index of refraction between the cores, the strain responses become misaligned along the length of the fiber. At the beginning of the fiber length, a bend induced strain response is not observed. However, as one progresses along the length of the fiber a strain response with a frequency equal to the spin rate of the fiber is observed to increase in magnitude. If the curves are resampled while adjusting the sample period during the interpolation of the strain signals, this oscillation can be minimized along the length of the fiber as depicted in FIG. 18. This provides a mechanism to compensate for variation in index of refraction when physical length measurements of the cores are not feasible.

In summary, relatively small variations in multi-core fiber structure may occur during the manufacturing process. Data processing based the model described by equation (9) is performed assuming an ideal geometry and providing parameters that quantify and compensate for non-ideal core placement. As an example of how variations in core placement can cause errors in the determination of the strain profile of the multi-core fiber, consider the case in which the center core is not placed along the neutral axis of the fiber. The initial model assumed that this central core does not respond to bend induced strain because it is placed along the neutral axis. But when the center core is placed off-center, the determined axial strain measurement shows an oscillating error when the fiber is bent due to the center core experiencing bend-induced strain. Consider the example axial strain signal for a multi-core fiber placed into a loop of bend radius 25 millimeters where this particular section of fiber was found to have a central core offset by 245 nanometers. The resulting error in axial strain is depicted in FIG. 19.

Figure 19:
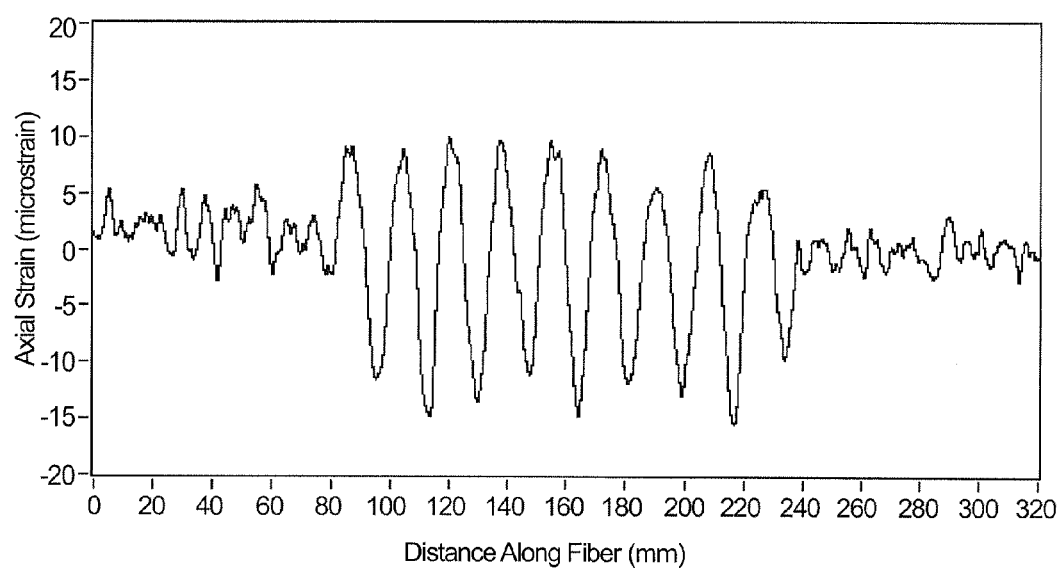
FIG. 19 is a graph showing an example of an axial strain response of a multi-core fiber placed into a 25 millimeter bend radius loop showing an error signal resulting from the center core being off center by 245 nanometers.
Figure 20:
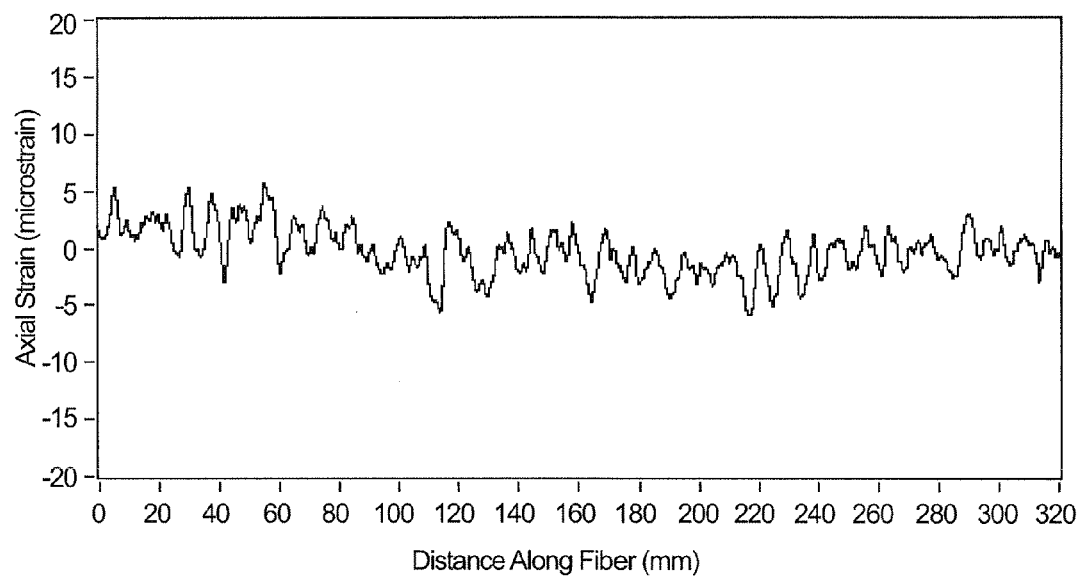
FIG. 20 is a graph showing an example of axial strain corrected by compensating for non-ideal core geometry.

As seen in FIG. 19, an error is observed in the axial strain signal as the center core experiences alternating elongation or compression in the region of 80 to 240 millimeters. For a loop of 25 millimeter bend radius, the axial strain response of the multi-core optical fiber would be expected to be linear. Since the center core did measure a bend induced strain response, this strain must be included in the bend induced component and removed from the axial strain component. This can be achieved by compensating for non-ideal geometry using the matrix implementation detailed in equation (11). FIG. 20 shows this error removed from the axial strain signal.

By accounting for the non-ideal fiber structure, it is possible to properly interpret the strain signals of the individual curves in the reconstruction of the axial strain applied to the multi-core fiber evidenced by the lack of oscillation in the region of the bend (80-240 millimeters).

Figure 21:
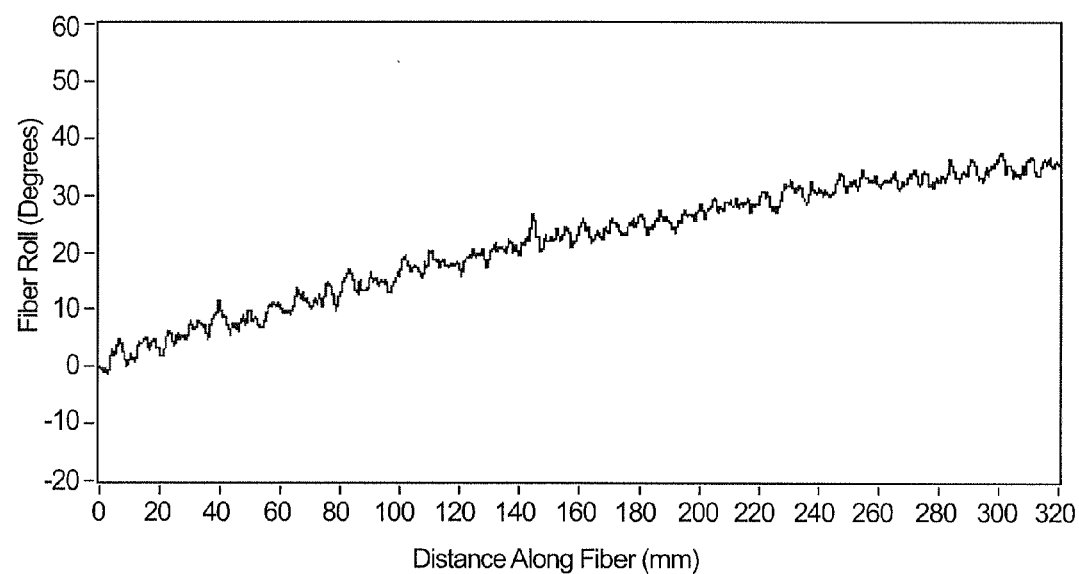
FIG. 21 is a graph showing an example of an appropriate fiber roll plot for a fiber placed in a loop of bend radius 25 millimeters.

The measured roll of the fiber is another example source of error that arises from a non-ideal fiber structure. As a torque is applied to the shape sensing fiber, the outer cores will experience either elongation or compression that can be scaled to a measure of fiber roll, or twist, at a given distance along the multi-core fiber. An example plot of fiber roll-versus distance of fiber is observed in FIG. 21 for a fiber placed in a loop with bend radius of 25 millimeters.

Figure 22:
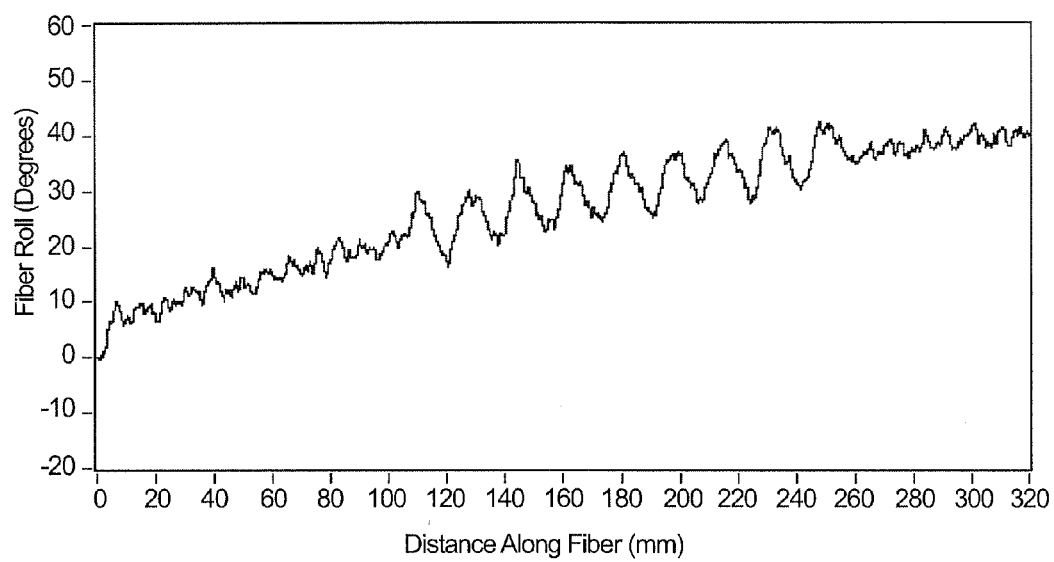
FIG. 22 illustrates an error in the twist signal of a fiber as result of non-ideal core geometry.

If non-ideal core placement is not compensated for during the reconstruction of the strain profile of the fiber, an error is observed in the extracted twist signal. Bend strain is once again misinterpreted and appears as an oscillation in the measure of fiber roll as seen in FIG. 22. In this particular case, the error observed is a result of the angular position of an outer core to be 1.1 degrees from the ideal position.

As applications for optical position and/or shape sensing technologies expand, variations from a non-ideal fiber structure must be measured and considered during the processing of the independent strain signals from the individual cores within the sensing fiber. The above described approach allows these variations from an ideal structure to be measured in a non-invasive method that does not compromise the integrity of the fiber. Attempting to remove the variations from an ideal structure during the manufacture process would be costly and impractical. With an approach that provides flexibility for manufacturing, high volume production of multi-core optical fiber sensors can be achieved without compromising the accuracy that can be achieved with a given sensor. Further, the cores within any spun multi-core optical fiber can be evaluated using this approach. This enables design a spun multi-core optical fiber with any number of waveguides or geometries. With the above described example model of the fiber, the technology of optical shape and/or position sensing can be applied to a wider range of applications as the sensor can be placed into more demanding fiber configurations.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An interferometric measurement system for measuring a spun optical fiber including multiple optical waveguides configured in the fiber, comprising:

interferometric detection circuitry configured to detect measurement interferometric pattern data associated with each of the multiple optical waveguides when the spun optical fiber is placed into a bend;

data processing circuitry configured to determine compensation parameters that compensate for variations between an optimal configuration of the multiple optical waveguides in the spun optical fiber and an actual configuration of multiple optical waveguides in the spun optical fiber based on the detected measurement interferometric pattern data; and a memory configured to store the compensation parameters for compensating subsequently-obtained measurement interferometric pattern data for the fiber.

2. The interferometric measurement system in claim 1, wherein the bend is a continuous bend in a plane.

3. The interferometric measurement system in claim 1, wherein the compensation parameters include a cross-sectional radial distance and a cross-sectional radial rotation angle for each of the multiple optical waveguides in the spun optical fiber.

4. The interferometric measurement system in claim 1, wherein the actual configuration of multiple optical waveguides in the spun optical fiber is based on an interferometric measurement of the optical fiber under strain, and wherein the compensation parameters include (1) a radial distance difference between an actual cross-sectional radial distance and an optimal cross-sectional radial distance for each of the multiple optical waveguides in the fiber and (2) a cross-sectional rotation angle difference between an actual cross-sectional rotation angle and an optimal cross-sectional rotation angle for each of the multiple optical waveguides in the fiber.

5. The interferometric measurement system in claim 1, wherein one of the multiple optical waveguides in the fiber is identified as a reference waveguide, and wherein the data processing circuitry is configured to:
   determine a complex spin signal for each of the multiple optical waveguides in the fiber;
   compare each complex spin signal to a reference complex spin signal; and
   determine individual waveguide radial and angular positions relative to the reference waveguide.

6. The interferometric measurement system in claim 5, wherein the individual waveguide radial positions are determined with an accuracy of tens of nanometers and individual waveguide angular positions are determined with an accuracy to a tenth of a degree.

7. The interferometric measurement system in claim 5, wherein the data processing circuitry is configured to:
   Fourier transform of the measurement interferometric pattern data associated with each of the multiple optical waveguides;
   locate and extract a spin frequency for each of the multiple optical waveguides using the Fourier Transformed measurement interferometric pattern data;
   inverse Fourier transform the spin frequency for each of the multiple optical waveguides to generate a corresponding complex spin signal; and
   process the complex spin signals to determine a radial distance compensation parameter and an angular compensation parameter for each of the multiple optical waveguides.

8. The interferometric measurement system in claim 1, wherein the data processing circuitry is configured to determine compensation parameters that compensate for variations between differences in length between the multiple optical waveguides.

9. The interferometric measurement system in claim 1, wherein the data processing circuitry is configured to determine compensation parameters that compensate for variations between indices of refraction between the multiple optical waveguides.

10. The interferometric measurement system in claim 1, wherein the data processing circuitry is configured to apply the compensation parameters to the detected measurement interferometric pattern data in order to distinguish between axial strain, bend strain, and twist strain on the spun optical fiber and to accurately determine one or more strain values for the fiber corresponding to one or more of the axial strain, bend strain, or twist strain on the spun optical fiber.

11. The interferometric measurement system in claim 10, wherein the data processing circuitry is configured to determine a shape of the spun optical fiber based on the determined one or more strain values for the spun optical fiber corresponding to one or more of the axial strain, bend strain, or twist strain on the spun optical fiber.

12. An interferometric measurement system, comprising:
   a spun optical fiber including multiple optical waveguides configured in the fiber;
   a memory configured to store compensation parameters that compensate for variations between an optimal configuration of the multiple optical waveguides in the spun optical fiber and an actual configuration of multiple optical waveguides in the spun optical fiber;
   interferometric detection circuitry configured to detect measurement interferometric pattern data associated with each of the multiple optical waveguides when the optical fiber is under a strain; and
   data processing circuitry configured to apply the compensation parameters to the detected measurement interferometric pattern data in order to distinguish between axial strain, bend strain, and twist strain on the fiber and to accurately determine one or more strain values for the fiber corresponding to one or more of the axial strain, bend strain, or twist strain on the fiber.

13. The interferometric measurement system in claim 12, wherein the data processing circuitry is configured to determine a shape of the optical fiber based on the determined one or more strain values for the fiber corresponding to one or more of the axial strain, bend strain, or twist strain on the fiber.

14. A non-transitory, computer-readable storage medium for use in an interferometric measurement system for measuring a spun optical fiber including multiple optical waveguides configured in the fiber, the non-transitory, computer-readable storage medium storing a computer program comprising instructions that provide a computer-based interferometric measurement system with compensation parameter information that compensates for variations between an optimal configuration of the multiple optical waveguides in the spun optical fiber and an actual configuration of multiple optical waveguides in the spun optical fiber determined based on detected measurement interferometric pattern data for the spun optical fiber positioned in a bend.

15. The non-transitory, computer-readable storage medium in claim 14, wherein the compensation parameter information includes a cross-sectional radial distance and a cross-sectional radial rotation angle for each of the multiple optical waveguides in the spun optical fiber.

16. The non-transitory, computer-readable storage medium in claim 14, wherein the actual configuration of multiple optical waveguides in the spun optical fiber is based on an interferometric measurement of the optical fiber under strain, and wherein the compensation parameter information includes (1) a radial distance difference between an actual cross-sectional radial distance and an optimal cross-sectional radial distance for each of the multiple optical waveguides in the fiber and (2) a cross-sectional rotation angle difference between an actual cross-sectional rotation angle and an optimal cross-sectional rotation angle for each of the multiple optical waveguides in the fiber.

17. The non-transitory, computer-readable storage medium in claim 14, wherein the compensation parameter information includes information to compensate for variations between differences in length between the multiple optical waveguides.

18. The non-transitory, computer-readable storage medium in claim 14, wherein the compensation parameter information includes information to compensate for variations between indices of refraction between the multiple optical waveguides.

19. An interferometric measurement method for measuring a spun optical fiber including multiple optical waveguides configured in the fiber, comprising:
   detecting measurement interferometric pattern data associated with each of the multiple optical waveguides when the spun optical fiber is placed into a bend;
   determining by data processing circuitry compensation parameters that compensate for variations between an optimal configuration of the multiple optical waveguides in the spun optical fiber and an actual configuration of multiple optical waveguides in the spun optical fiber based on the detected measurement interferometric pattern data; and
   storing in memory the compensation parameters for compensating subsequently-obtained measurement interferometric pattern data for the fiber.

20. The interferometric measurement method in claim 19, wherein the bend is a continuous bend in a plane.

21. The interferometric measurement method in claim 19, wherein the compensation parameters include a cross-sectional radial distance and a cross-sectional radial rotation angle for each of the multiple optical waveguides in the spun optical fiber.

22. The interferometric measurement method in claim 19, wherein the actual configuration of multiple optical waveguides in the spun optical fiber is based on an interferometric measurement of the optical fiber under strain, and wherein the compensation parameters include (1) a radial distance difference between an actual cross-sectional radial distance and an optimal cross-sectional radial distance for each of the multiple optical waveguides in the fiber and (2) a cross-sectional rotation angle difference between an actual cross-sectional rotation angle and an optimal cross-sectional rotation angle for each of the multiple optical waveguides in the fiber.

23. The interferometric measurement system method in claim 19, wherein one of the multiple optical waveguides in the fiber is identified as a reference waveguide, and wherein the method further comprises:
   determining a complex spin signal for each of the multiple optical waveguides in the fiber;
   comparing each complex spin signal to a reference complex spin signal; and
   determining individual waveguide radial and angular positions relative to the reference waveguide.

24. The interferometric measurement method in claim 23, wherein the individual waveguide radial positions are determined with an accuracy of tens of nanometers and individual waveguide angular positions are determined with an accuracy to a tenth of a degree.

25. The interferometric measurement method in claim 23, further comprising:
   Fourier transforming the measurement interferometric pattern data associated with each of the multiple optical waveguides;
   locating and extracting a spin frequency for each of the multiple optical waveguides using the Fourier Transformed measurement interferometric pattern data;
   inverse Fourier transform the spin frequency for each of the multiple optical waveguides to generate a corresponding complex spin signal; and
   processing the complex spin signals to determine a radial distance compensation parameter and an angular compensation parameter for each of the multiple optical waveguides.

26. The interferometric measurement method in claim 19, further comprising determining compensation parameters that compensate for variations between differences in length between the multiple optical waveguides.

27. The interferometric measurement method in claim 19, further comprising determining compensation parameters that compensate for variations between indices of refraction between the multiple optical waveguides.

28. The interferometric measurement method in claim 19, further comprising applying the compensation parameters to the detected measurement interferometric pattern data in order to distinguish between axial strain, bend strain, and twist strain on the spun optical fiber and to accurately determine one or more strain values for the fiber corresponding to one or more of the axial strain, bend strain, or twist strain on the spun optical fiber.

29. The interferometric measurement method in claim 28, further comprising determining a shape of the spun optical fiber based on the determined one or more strain values for the spun optical fiber corresponding to one or more of the axial strain, bend strain, or twist strain on the spun optical fiber.

* * * * *